United States Patent
Gao

(10) Patent No.: US 12,255,855 B2
(45) Date of Patent: Mar. 18, 2025

(54) WIRELESS COMMUNICATION METHOD AND APPARATUS, AND RADIO FREQUENCY SUBSYSTEM WITH LOCAL OSCILLATOR CIRCUIT

(71) Applicant: HUAWEI TECHNOLOGIES CO., LTD., Shenzhen (CN)

(72) Inventor: Peng Gao, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 513 days.

(21) Appl. No.: 17/561,204

(22) Filed: Dec. 23, 2021

(65) Prior Publication Data

US 2022/0116193 A1 Apr. 14, 2022

Related U.S. Application Data

(63) Continuation of application No. PCT/CN2019/093956, filed on Jun. 29, 2019.

(51) Int. Cl.
*H04L 5/14* (2006.01)
*H04B 1/38* (2015.01)
(Continued)

(52) U.S. Cl.
CPC ............... *H04L 5/14* (2013.01); *H04B 1/40* (2013.01)

(58) Field of Classification Search
CPC .. H04L 5/14; H04L 25/22; H04B 1/40; H04B 3/20; H04B 1/38
See application file for complete search history.

(56) References Cited

U.S. PATENT DOCUMENTS

| 4,607,215 A * | 8/1986 | Takano | G01R 23/16 324/76.23 |
| 6,591,100 B1 * | 7/2003 | Dent | H04W 48/16 455/515 |

(Continued)

FOREIGN PATENT DOCUMENTS

| CN | 1630279 A | 6/2005 |
| CN | 101227212 A | 7/2008 |

(Continued)

OTHER PUBLICATIONS

Written opinion of international searching authority for PCT/CN2019/093956 (Year: 2020).*

(Continued)

*Primary Examiner* — Jenee Holland
(74) *Attorney, Agent, or Firm* — HAUPTMAN HAM, LLP

(57) ABSTRACT

A wireless communication method and apparatus, and a radio frequency subsystem are provided. The apparatus includes a local oscillator circuit, configured to provide a local oscillator signal; a radio frequency transmitter coupled to the local oscillator circuit, configured to send a first signal on a first carrier based on the local oscillator signal provided by the local oscillator circuit; a radio frequency receiver coupled to the local oscillator circuit, configured to receive a second signal on a second carrier based on a local oscillator signal of a same frequency as the local oscillator signal provided by the local oscillator circuit; and a digital frequency converter coupled to the radio frequency transmitter and the radio frequency receiver, configured to provide a digital frequency conversion operation to compensate for a frequency difference between a center frequency of the first carrier and a center frequency of the second carrier.

20 Claims, 12 Drawing Sheets

(51) Int. Cl.
*H04B 1/40* (2015.01)
*H04B 1/403* (2015.01)

(56) References Cited

U.S. PATENT DOCUMENTS

| | | | | | |
|---|---|---|---|---|---|
| 9,712,363 | B2* | 7/2017 | Tong | ............... | H04B 7/068 |
| 10,935,631 | B2* | 3/2021 | Storz | ............... | G01S 7/35 |
| 10,951,445 | B2* | 3/2021 | Sung | ............... | H04B 1/403 |
| 2004/0152437 | A1* | 8/2004 | Behzad | ............... | H04B 1/18 |
| | | | | | 455/326 |
| 2006/0066759 | A1* | 3/2006 | Ikuma | ............... | H04N 5/455 |
| | | | | | 455/182.2 |
| 2009/0088101 | A1* | 4/2009 | Agawa | ............... | H04B 1/38 |
| | | | | | 455/127.2 |
| 2009/0172748 | A1 | 7/2009 | Petruzzelli | | |
| 2009/0274079 | A1* | 11/2009 | Bhatia | ............... | H04B 1/403 |
| | | | | | 370/310 |
| 2013/0142232 | A1* | 6/2013 | Lee | ............... | H04B 1/40 |
| | | | | | 375/222 |
| 2015/0043685 | A1* | 2/2015 | Choi | ............... | H04B 1/525 |
| | | | | | 375/346 |
| 2015/0124634 | A1* | 5/2015 | Harel | ............... | H04W 24/08 |
| | | | | | 370/278 |
| 2015/0156004 | A1* | 6/2015 | Khandani | ............... | H04L 1/0031 |
| | | | | | 370/278 |
| 2015/0334710 | A1* | 11/2015 | Tang | ............... | H04B 1/30 |
| | | | | | 370/329 |
| 2015/0381186 | A1* | 12/2015 | Scuderi | ............... | H03L 7/00 |
| | | | | | 331/16 |
| 2016/0050127 | A1* | 2/2016 | Prodan | ............... | H04B 1/40 |
| | | | | | 375/222 |
| 2019/0089434 | A1* | 3/2019 | Rainish | ............... | H04B 7/086 |
| 2019/0158193 | A1* | 5/2019 | Jain | ............... | H04L 5/14 |
| 2019/0165975 | A1* | 5/2019 | Sung | ............... | H04L 27/2272 |

FOREIGN PATENT DOCUMENTS

| | | | | |
|---|---|---|---|---|
| CN | 102457292 A | 5/2012 | | |
| CN | 102457858 A | 5/2012 | | |
| CN | 102694761 A | 9/2012 | | |
| CN | 102754385 A | 10/2012 | | |
| CN | 103414490 A | 11/2013 | | |
| CN | 103580703 A | 2/2014 | | |
| EP | 3944540 A1 | 1/2022 | | |
| WO | WO2014078311 | * | 5/2014 | ............ H03B 19/00 |
| WO | WO-2014078311 A2 | * | 5/2014 | ............ H03B 19/00 |

OTHER PUBLICATIONS

Chinese Office Action issued in corresponding Chinese Application No. 201980097622.1, dated May 31, 2022, pp. 1-7.

Gomaa Ahmad et al: "Receiver Architecturefor Frequency Offset Correction and I/QImbalance Compensation in Equal BandwidthContiguous Carrier Aggregation" IEEE Transactions on Vehicular Technology, IEEE, USA, vol. 65, No. 10, Oct. 2016 (Oct. 1, 2016), pp. 8730-8735, XP011625725.

Extended European Search Report issued in corresponding European Application No. 19936181.7, dated May 18, 2022, pp. 1-9.

International Search Report issued in corresponding International Application No. PCT/CN2019/093956, dated Mar. 27, 2020, pp. 1-12.

* cited by examiner

WIRELESS COMMUNICATION METHOD AND APPARATUS, AND RADIO FREQUENCY SUBSYSTEM WITH LOCAL OSCILLATOR CIRCUIT

CROSS-REFERENCE TO RELATED APPLICATIONS

This application is a continuation of International Application No. PCT/CN2019/093956, filed on Jun. 29, 2019, the disclosure of which is hereby incorporated by reference in its entirety.

BACKGROUND

In a wireless communication system, a time division duplex (TDD) technology is widely used for communication. In a TDD wireless communication system, a signal is received and sent on a same spectrum resource, but signal receiving and sending operations are implemented in different slots (Slots). Because the signal is received and sent on the same spectrum resource, a center frequency of a spectrum of a signal received by a communication device is the same as a center frequency of a spectrum of a signal sent by the communication device. Therefore, local oscillator (LO) signals used by a receiver and a transmitter of the communication device is a same LO signal. Therefore, in a design of a radio frequency transceiver, a common phase locked loop (PLL) is used to generate an LO signal configured for use by the receiver and the transmitter at the same time.

To meet users' conditions for a peak rate and a system capacity, a carrier aggregation (CA) technology is introduced in communication systems such as a long term evolution-advanced (LTE-A) system and a new radio (NR) system. In this way, more radio spectrum resources are allocated to the user, and throughput is increased. Based on the CA technology, one or more component carriers (CCs) is dynamically allocated to the communication device for use based on users' conditions for service volume. In a TDD wireless communication system using the CA technology, a condition for a volume of data received by the communication device is usually different from a condition for a volume of data sent by the communication device. Therefore, a bandwidth of a spectrum resource of a signal received by the communication device is different from a bandwidth of a spectrum resource of a signal sent by the communication device. As a result, a center frequency of a spectrum of the received signal is different from a center frequency of a spectrum of the sent signal.

In this application scenario of different center frequencies, the receiver and the transmitter of the communication device separately uses LO signals of different frequencies. Therefore, when sending a signal, the PLL outputs an LO signal of the center frequency configured for use by the sent signal; and when receiving a signal, the PLL outputs an LO signal of the center frequency configured for use by the received signal. In a current communication process of the TDD system, a transmit slot and a receive slot are usually consecutive. Therefore, an LO signal output by the PLL switches between the two slots from one center frequency to another center frequency. During PLL switching, the communication device cannot transmit data. However, PLL switching duration is long, which is generally about 100 μs. Therefore, providing the local oscillator signals for the receiver and the transmitter through switching a frequency of an LO signal output by the PLL between the receive slot and the transmit slot seriously affects receive and transmit performance. Therefore, when the center frequency of the spectrum of the signal received by the communication device is different from the center frequency of the spectrum of the signal sent by the communication device, how to reduce degradation of communication performance when the PLL switches the frequency of the output LO signal is an urgent problem to be resolved.

SUMMARY

An objective of implementations of this application is to provide a wireless communication method and apparatus, and a radio frequency subsystem, to resolve a problem that communication performance is degraded when a PLL switches a frequency of an output LO signal.

In solutions provided in embodiments of this application, the wireless communication apparatus are a wireless communication device, or is some components in a wireless communication device, for example, an integrated circuit product such as a system chip or a communication chip. The wireless communication device is a computer device that supports a wireless communication function.

The wireless communication device is a terminal such as a smartphone, or is a radio access network device such as a base station. The system chip is also referred to as a system on chip (system on chip, SoC), or briefly referred to as a SoC chip. The communication chip includes a baseband processing chip and a radio frequency processing chip. The baseband processing chip is also sometimes referred to as a modem (modem) or a baseband chip. The radio frequency processing chip is also sometimes referred to as a radio frequency transceiver (transceiver) or a radio frequency chip. In a physical implementation, some or all chips of the communication chip is integrated into the SoC chip. For example, the baseband processing chip is integrated into the SoC chip, but the radio frequency processing chip is not integrated into the SoC chip.

According to a first aspect, a wireless communication apparatus is provided, including: a local oscillator circuit, configured to provide a local oscillator signal; a radio frequency transmitter coupled to the local oscillator circuit, configured to send a first signal on a first carrier based on the local oscillator signal provided by the local oscillator circuit; a radio frequency receiver coupled to the local oscillator circuit, configured to receive a second signal on a second carrier based on a local oscillator signal of a same frequency as the local oscillator signal provided by the local oscillator circuit; and a digital frequency converter coupled to the radio frequency transmitter and the radio frequency receiver, configured to provide a digital frequency conversion operation to compensate for a frequency difference between a center frequency of the first carrier and a center frequency of the second carrier.

In the foregoing wireless communication apparatus, when the center frequency of the first carrier is different from the center frequency of the second carrier, a frequency of the local oscillator signal provided by the local oscillator circuit is not constantly switched, and remains unchanged. Instead, the digital frequency conversion operation is implemented by using the digital frequency converter, to compensate for the frequency difference between the center frequency of the first carrier and the center frequency of the second carrier. This avoids a data transmission interruption caused when the frequency of the local oscillator signal provided by the local oscillator circuit is switched, thereby improving system performance.

In an optional implementation, the frequency of the local oscillator signal provided by the local oscillator circuit is equal to the center frequency of the first carrier, the digital frequency converter is configured to convert the second signal into a baseband signal by performing the digital frequency conversion operation, and a frequency switching range of the digital frequency conversion operation is the frequency difference between the center frequency of the first carrier and the center frequency of the second carrier.

In an optional implementation, the frequency of the local oscillator signal provided by the local oscillator circuit is equal to the center frequency of the second carrier, the digital frequency converter is configured to convert a baseband signal into the first signal by performing the digital frequency conversion operation, and a frequency switching range of the digital frequency conversion operation is the frequency difference between the center frequency of the first carrier and the center frequency of the second carrier.

In an optional implementation, the wireless communication apparatus further includes a baseband subsystem, configured to process the baseband signal.

In an optional implementation, the digital frequency converter includes a first digital frequency converter and a second digital frequency converter, the first digital frequency converter is coupled to the radio frequency transmitter, and the second digital frequency converter is coupled to the radio frequency receiver.

In an optional implementation, the first carrier includes one component carrier, and the second carrier includes a plurality of component carriers.

In an optional implementation, the first carrier includes a plurality of component carriers, and the second carrier includes one component carrier.

In an optional implementation, both the first carrier and the second carrier are time division duplex TDD carriers, and the first carrier and the second carrier are located on a same frequency band.

In an optional implementation, the local oscillator circuit includes a first local oscillator and a second local oscillator; the radio frequency transmitter includes a first radio frequency transmitter and a second radio frequency transmitter; the radio frequency receiver includes a first radio frequency receiver and a second radio frequency receiver; the first local oscillator is coupled to the first radio frequency transmitter and the first radio frequency receiver, and provides a local oscillator signal that is of a same frequency as the local oscillator signal provided by the local oscillator and that is configured for use for a first-stage analog frequency mixing operation; and the second local oscillator is coupled to the second radio frequency transmitter and the second radio frequency receiver, and provides a local oscillator signal that is of a same frequency as the local oscillator signal provided by the local oscillator and that is configured for use for a second-stage analog frequency mixing operation.

In an optional implementation, both the first carrier and the second carrier are in the frequency range 2 of the new radio NR specification of the $3^{rd}$ generation partnership project 3GPP.

In an optional implementation, the digital frequency converter, the radio frequency receiver, and the radio frequency transmitter are integrated into a same integrated circuit chip.

According to a second aspect, a wireless communication apparatus is further provided. The wireless communication apparatus are a wireless communication device, or is a group of chips in a wireless communication device, for example, a radio frequency chip and a baseband chip. The wireless communication apparatus includes:

a local oscillator circuit, configured to provide a local oscillator signal; a radio frequency transceiver coupled to the local oscillator circuit, configured to send a first signal on a first carrier based on the local oscillator signal provided by the local oscillator circuit, and receive a second signal on a second carrier based on a local oscillator signal of a same frequency as the local oscillator signal provided by the local oscillator circuit; and a digital frequency converter coupled to the radio frequency transceiver, configured to provide a digital frequency conversion operation to compensate for a frequency difference between a center frequency of the first carrier and a center frequency of the second carrier.

In the foregoing wireless communication apparatus, when the center frequency of the first carrier is different from the center frequency of the second carrier, a frequency of the local oscillator signal provided by the local oscillator circuit is not constantly adjusted, and remains unchanged. Instead, the digital frequency conversion operation is implemented by using the digital frequency converter, to compensate for the frequency difference between the center frequency of the first carrier and the center frequency of the second carrier. This avoids a data transmission interruption caused when the frequency of the local oscillator signal provided by the local oscillator circuit is adjusted, thereby improving system performance.

According to a third aspect, a wireless communication apparatus is further provided. The wireless communication apparatus are a wireless communication device, or is a group of chips in a wireless communication device, for example, a radio frequency chip and a baseband chip. The wireless communication apparatus includes:

a local oscillator circuit, configured to provide a local oscillator signal; a radio frequency transmitter coupled to the local oscillator circuit, configured to send a first signal on a first carrier based on the local oscillator signal provided by the local oscillator circuit; a radio frequency receiver coupled to the local oscillator circuit, configured to receive a second signal on a second carrier based on a local oscillator signal of a same frequency as the local oscillator signal provided by the local oscillator circuit; and a digital frequency converter coupled to the radio frequency transmitter and the radio frequency receiver, configured to compensate for a frequency difference between a center frequency of the first carrier and a center frequency of the second carrier.

In the foregoing wireless communication apparatus, when the center frequency of the first carrier is different from the center frequency of the second carrier, a frequency of the local oscillator signal provided by the local oscillator circuit is not constantly adjusted, and remains unchanged. Instead, the digital frequency conversion operation is implemented by using the digital frequency converter, to compensate for the frequency difference between the center frequency of the first carrier and the center frequency of the second carrier. This avoids a data transmission interruption caused when the frequency of the local oscillator signal provided by the local oscillator circuit is adjusted, thereby improving system performance.

In an optional implementation, the digital frequency converter includes a first digital frequency converter and a second digital frequency converter, the first digital frequency converter is coupled to the radio frequency transmitter, and the second digital frequency converter is coupled to the radio frequency receiver; and when the center frequency of the second carrier is the same as the frequency of the local oscillator signal, a frequency of a first digital frequency conversion signal output by the first digital frequency converter based on an input first baseband signal is equal to a difference between the center frequency of the first carrier and the frequency of the local oscillator signal; or when the center frequency of the first carrier is the same as the frequency of the local oscillator signal, a frequency of a second digital frequency conversion signal input by the second digital frequency converter is equal to a difference between the center frequency of the second carrier and the frequency of the local oscillator signal, and the second digital frequency converter output a second baseband signal based on the second digital frequency conversion signal.

In an optional implementation, the second carrier includes M component carriers CCs, and the first carrier includes N CCs, where N and M are integers greater than 0, and N is less than M.

In an optional implementation, M is equal to 4, and N is equal to 1.

Center frequencies of the four CCs included in the second carrier are 2470 MHZ, 2490 MHZ, 2510 MHZ, and 2530 MHz; and a center frequency of the one CC included in the first carrier is any one of the following: 2470 MHZ, 2490 MHz, 2510 MHZ, and 2530 MHZ.

In an optional implementation, the first carrier includes M CCs, and the second carrier includes N component carriers CCs, where N and M are integers greater than 0, and N is less than M.

In an optional implementation, M is equal to 4, and N is equal to 1.

Center frequencies of the four CCs included in the first carrier are 2470 MHZ, 2490 MHZ, 2510 MHZ, and 2530 MHz; and a center frequency of the one CC included in the second carrier is any one of the following: 2470 MHZ, 2490 MHZ, 2510 MHZ, and 2530 MHZ.

In an optional implementation, the local oscillator circuit includes a first local oscillator and a second local oscillator, the radio frequency transmitter includes a first radio frequency transmitter and a second radio frequency transmitter, and the radio frequency receiver includes a first radio frequency receiver and a second radio frequency receiver.

The first local oscillator is configured to output a first local oscillator signal, and the second local oscillator is configured to output a second local oscillator signal.

The first radio frequency transmitter coupled to the first local oscillator is configured to receive the first digital frequency conversion signal, and perform an analog frequency conversion operation on the first digital frequency conversion signal based on the first local oscillator signal to obtain a third signal.

The second radio frequency transmitter coupled to the second local oscillator is configured to receive the third signal, perform an analog frequency conversion operation on the third signal based on the second local oscillator signal to obtain the first signal, and transmit the first signal on the first carrier.

The second radio frequency receiver coupled to the second local oscillator is configured to receive the second signal on the second carrier, and perform a digital frequency conversion operation on the second signal based on the second local oscillator signal to obtain a fourth signal.

The first radio frequency receiver coupled to the first local oscillator is configured to receive the fourth signal, and perform a digital frequency conversion operation on the fourth signal based on the second local oscillator signal to obtain the second digital frequency conversion signal.

In an optional implementation, both the first carrier and the second carrier are in the frequency range 2 of the new radio NR specification of the 3rd generation partnership project 3GPP.

In an optional implementation, the digital frequency converter, the radio frequency receiver, and the radio frequency transmitter are integrated into a same integrated circuit chip.

In the foregoing implementations, a signal bandwidth on an interface between the baseband subsystem and the radio frequency receiver or the radio frequency transmitter is reduced, and transmission load on the interface is reduced.

According to a fourth aspect, a wireless communication method is further provided. The method is performed by the wireless communication apparatus in the foregoing solutions, and includes: A radio frequency subsystem generates a local oscillator signal. The radio frequency subsystem sends a first signal on a first carrier based on the local oscillator signal, and receives a second signal on a second carrier based on a local oscillator signal of a same frequency as the local oscillator signal. A center frequency of the first carrier is different from a center frequency of the second carrier. The radio frequency subsystem further provides a digital frequency conversion operation to compensate for a frequency difference between the center frequency of the first carrier and the center frequency of the second carrier.

In an optional implementation, a frequency of the local oscillator signal is equal to the center frequency of the first carrier, and the digital frequency conversion operation provided by the radio frequency subsystem includes:

The radio frequency subsystem converts the second signal into a baseband signal by performing the digital frequency conversion operation, where a frequency switching range of the digital frequency conversion operation is the frequency difference between the center frequency of the first carrier and the center frequency of the second carrier.

In an optional implementation, a frequency of the local oscillator signal is equal to the center frequency of the second carrier, and the digital frequency conversion operation provided by the radio frequency subsystem includes:

The radio frequency subsystem converts a baseband signal into the first signal by performing the digital frequency conversion operation, where a frequency switching range of the digital frequency conversion operation is the frequency difference between the center frequency of the first carrier and the center frequency of the second carrier.

In an optional implementation, the first carrier includes one component carrier, and the second carrier includes a plurality of component carriers.

In an optional implementation, the first carrier includes a plurality of component carriers, and the second carrier includes one component carrier.

In an optional implementation, both the first carrier and the second carrier are time division duplex TDD carriers, and the first carrier and the second carrier are located on a same frequency band.

In an optional implementation, both the first carrier and the second carrier are in the frequency range 2 of the new radio NR specification of the 3rd generation partnership project 3GPP.

According to a fifth aspect, a wireless communication method is further provided. The method is performed by the wireless communication apparatus in the foregoing solutions, and includes: A baseband subsystem generates a local oscillator signal. The baseband subsystem sends a first signal on a first carrier based on the local oscillator signal, and receives a second signal on a second carrier based on a local oscillator of a same frequency as the local oscillator signal. A center frequency of the first carrier is different from a center frequency of the second carrier. The radio frequency subsystem further provides a digital frequency conversion operation to compensate for a frequency difference between the center frequency of the first carrier and the center frequency of the second carrier.

In an optional implementation, a frequency of the local oscillator signal is equal to the center frequency of the first carrier, and the digital frequency conversion operation provided by the radio frequency subsystem includes:

The radio frequency subsystem converts the second signal into a baseband signal by performing the digital frequency conversion operation, where a frequency switching range of the digital frequency conversion operation is the frequency difference between the center frequency of the first carrier and the center frequency of the second carrier.

In an optional implementation, a frequency of the local oscillator signal is equal to the center frequency of the second carrier, and the digital frequency conversion operation provided by the radio frequency subsystem includes:

The radio frequency subsystem converts a baseband signal into the first signal by performing the digital frequency conversion operation, where a frequency switching range of the digital frequency conversion operation is the frequency difference between the center frequency of the first carrier and the center frequency of the second carrier.

In an optional implementation, the first carrier includes one component carrier, and the second carrier includes a plurality of component carriers.

In an optional implementation, the first carrier includes a plurality of component carriers, and the second carrier includes one component carrier.

In an optional implementation, both the first carrier and the second carrier are time division duplex TDD carriers, and the first carrier and the second carrier are located on a same frequency band.

In an optional implementation, both the first carrier and the second carrier are in the frequency range 2 of the new radio NR specification of the 3rd generation partnership project 3GPP.

According to a sixth aspect, a radio frequency subsystem is further provided, including:
a processor and a memory, where
the memory is configured to store program instructions; and
the processor is configured to execute the program instructions stored in the memory, so that the radio frequency subsystem implements the method in any one of the foregoing possible designs.

According to a seventh aspect, a radio frequency subsystem is further provided, including:
a processor and an interface circuit, where
the interface circuit is configured to access a memory, and the memory stores program instructions; and
the processor is configured to access the memory through the interface circuit, and execute the program instructions stored in the memory, so that the radio frequency subsystem implements the method in any one of the foregoing possible designs.

According to an eighth aspect, a baseband subsystem is further provided, including:
a processor and a memory, where
the memory is configured to store program instructions; and
the processor is configured to execute the program instructions stored in the memory, so that the baseband subsystem implements the method in any one of the foregoing possible designs.

According to a ninth aspect, a baseband subsystem is further provided, including:
a processor and an interface circuit, where
the interface circuit is configured to access a memory, and the memory stores program instructions; and
the processor is configured to access the memory through the interface circuit, and execute the program instructions stored in the memory, so that the baseband subsystem implements the method in any one of the foregoing possible designs.

An embodiment of this application provides a wireless communication apparatus. The apparatus includes a storage unit, configured to store program instructions; and a processing unit, configured to execute the program instructions in the storage unit, to implement the method in any one of the foregoing possible designs of the foregoing plurality of technical solutions.

The storage unit is a memory, for example, a volatile memory, configured to cache the program instructions. The program instructions are loaded into the storage unit from another non-volatile memory when the data scheduling method is performed. Certainly, the storage unit alternatively is a non-volatile memory, and is also integrated inside a chip. The processing unit is a processor, for example, one or more processing cores of the chip.

An embodiment of this application provides a computer-readable storage medium. The computer storage medium stores computer-readable instructions. When a computer reads and executes the computer-readable instructions, a communication apparatus is enabled to perform the method according to any one of the foregoing possible designs.

An embodiment of this application provides a computer program product. When a computer reads and executes the computer program product, a communication apparatus is enabled to perform the method according to any one of the foregoing possible designs.

An embodiment of this application provides a chip. The chip is connected to a memory, and is configured to read and execute a software program stored in the memory, to implement the method according to any one of the foregoing possible designs.

In the technical solutions provided in the foregoing aspects and the optional implementations of the foregoing aspects, because the digital frequency conversion operation is implemented by using the digital frequency converter to compensate for the frequency difference between the center frequency of the first carrier and the center frequency of the second carrier, the frequency of the local oscillator signal is not adjusted. In addition, a time period configured for use for the digital frequency conversion is short. Therefore, this avoids the data transmission interruption caused when the frequency of the local oscillator signal provided by the local oscillator circuit is adjusted, thereby improving performance of a wireless communication system.

DESCRIPTION OF EMBODIMENTS

Figure 1:
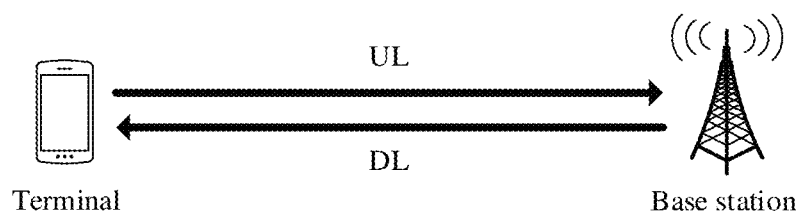
FIG. 1 is a schematic diagram of a structure of a wireless communication system according to an embodiment of this application.

The following further describes technical solutions provided in this application with reference to accompanying drawings and embodiments. A system structure and a service scenario provided in embodiments of this application are mainly intended to explain some possible implementations of technical solutions in this application, and not construed as a unique limitation on the technical solutions in this application. A person of ordinary skill in the art knows that, as a system evolves and an updated service scenario emerges, the technical solutions provided in this application are still applicable to a same or similar technical problem.

In the following description of specific embodiments of the technical solutions provided in the embodiments of this application, some repeated parts are not described again, but the specific embodiments are mutually referenced and is combined with each other.

In a wireless communication system, devices are classified into devices that provide a wireless network service and devices that use a wireless network service. The devices that provide the wireless network service are devices that form a wireless communication network, and is briefly referred to as network devices (network devices) or network elements (network elements). The network devices are typically owned by a carrier or an infrastructure provider, and are operated or maintained by these vendors. The network devices further are classified into a radio access network (radio access network, RAN) device and a core network (core network, CN) device. The RAN device typically includes a base station (base station, BS).

The base station is also sometimes referred to as a wireless access point (access point, AP) or a transmission reception point (transmission reception point, TRP). The base station is a universal NodeB (next generation NodeB, gNB) in a 5G new radio (new radio, NR) system or an evolved NodeB (evolved NodeB, eNB) in a 4G long term evolution (long term evolution, LTE) system. Base stations are classified into a macro base station (macro base station) or a micro base station (micro base station) based on different physical forms or transmit powers of the base stations. The micro base station is also sometimes referred to as a small base station or a small cell (small cell).

The device that uses the wireless network service is briefly referred to as a terminal (terminal). The terminal establishes a connection to the network device, and provide a specific wireless communication service for a user based on a service of the network device. Because the terminal has a closer relationship with the user, the terminal is also sometimes referred to as user equipment (user equipment, UE) or a subscriber unit (subscriber unit, SU). In addition, compared with a base station that is usually placed at a fixed location, the terminal usually moves along with the user, and is also sometimes referred to as a mobile station (mobile station, MS). In addition, some network devices such as a relay node (relay node, RN) or a wireless router is also sometimes considered as terminals because the network devices have a UE identity or belong to the user.

The terminal is a mobile phone (mobile phone), a tablet computer (tablet computer), a laptop computer (laptop computer), a wearable device (for example, a smartwatch, a smart band, a smart helmet, or smart glasses), other devices that have a wireless access capability, for example, an intelligent vehicle, various internet of things (Internet of things, IOTs) devices including various smart home devices (such as a smart meter and a smart home appliance) and smart city devices (such as a security or monitoring device and an intelligent road transportation facility), and the like.

For ease of description, the technical solutions in the embodiments of this application are described in detail by using the base station and the terminal as examples in this application.

FIG. 1 is a schematic diagram of a structure of a wireless communication system according to an embodiment of this application. As shown in FIG. 1, the wireless communication system includes a terminal and a base station. Based on different transmission directions, a transmission link from the terminal to the base station is referred to as an uplink (uplink, UL), and a transmission link from the base station to the terminal is referred to as a downlink (downlink, DL). Similarly, data transmission over the uplink is briefly referred to as uplink data transmission or uplink transmission, and data transmission over the downlink is briefly referred to as downlink data transmission or downlink transmission.

In the wireless communication system, the base station provides communication coverage for a specific geographical area by using an integrated or external antenna device. One or more terminals in a communication coverage area of the base station is connected to the base station. One base station manages one or more cells (cells). Each cell has one identity (identity). The identity is also referred to as a cell identifier (cell identifier, cell ID). From a perspective of a radio resource, a cell is a combination of a downlink radio resource and an uplink radio resource (optional) that is paired with the downlink radio resource.

The wireless communication system complies with a wireless communication standard in the $3^{rd}$ generation partnership project (3rd generation partnership project, 3GPP), or complies with another wireless communication standard, for example, a wireless communication standard in the 802 series standards (for example, 802.11, 802.15, or 802.20) of the Institute of Electrical and Electronics Engineers (Institute of Electrical and Electronics Engineers, IEEE).

Although FIG. 1 shows one base station and one terminal, the wireless communication system alternatively includes other quantities of terminals and base stations. In addition, the wireless communication system further includes another network device, for example, a core network device.

The terminal and the base station are configured to use configurations predetermined by the wireless communication system, including a radio access technology (radio access technology, RAT) supported by the system and a configuration of a radio resource stipulated by the system, for example, basic configurations of a radio frequency band and a carrier. The carrier is a frequency range that complies with a stipulation of the system. The frequency range is determined jointly based on a center frequency of the carrier (denoted as a carrier frequency) and a bandwidth of the carrier. The configurations predetermined by the system is used as a part of a standard protocol for the wireless communication system, or is determined through interaction between the terminal and the base station. Content of a related standard protocol is prestored in memories of the terminal and the base station, or reflected as hardware circuits or software code of the terminal and the base station.

In the wireless communication system, the terminal and the base station each support one or more same RATs, for example, 5G NR, 4G LTE, or a RAT for a future evolved system. The terminal and the base station each use a same air interface parameter, a same coding scheme, a same modulation scheme, and the like, and communicate with each other based on the radio resource stipulated by the system.

Figure 2:
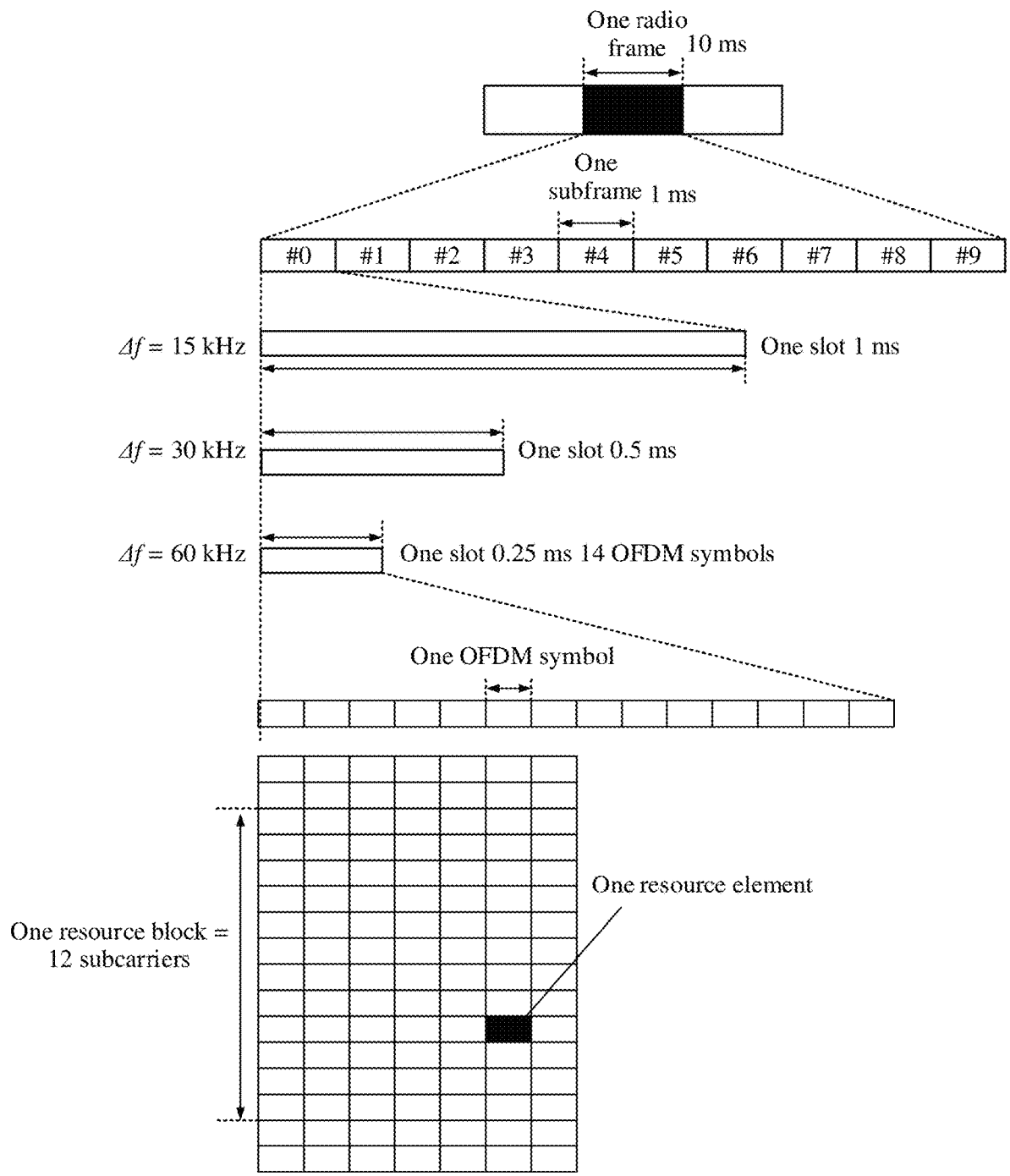
FIG. 2 is a schematic diagram of a radio resource according to an embodiment of this application.

FIG. 2 is a schematic diagram of a radio resource according to an embodiment of this application. FIG. 2 shows a time-frequency resource grid (grid) supported by a wireless communication system. The time-frequency resource grid corresponds to one or more carriers. Different carriers corresponds to different time-frequency resource grids. For a frequency division duplex (frequency division duplex, FDD) system, a carrier used for uplink transmission is different from a carrier used for downlink transmission, and corresponds to different time-frequency resource grids. For a time division duplex TDD system, one carrier corresponds to one time-frequency resource grid, some time-frequency resources are used for uplink transmission, and some time-frequency resources are used for downlink transmission.

In the time-frequency resource grid shown in FIG. 2, a unit of a time resource is one orthogonal frequency division multiplexing (orthogonal frequency division multiplexing, OFDM) symbol (symbol, symb), and a unit of a frequency resource is one subcarrier (subcarrier, SC). A minimum grid in the time-frequency resource grid corresponds to one OFDM symbol and one subcarrier, and is referred to as a resource element (resource element, RE) in a technical specification of the 3GPP.

An NR system is used as an example. A frequency domain resource used for NR transmission (including uplink transmission and downlink transmission) is divided into a plurality of subcarriers. 12 consecutive subcarriers are denoted as one resource block (resource block, RB). A time domain resource used for NR transmission is divided into a plurality of radio frames (frames) whose duration is 10 ms. Each radio frame is evenly divided into 10 subframes (subframes) whose duration is 1 ms. Each subframe is further divided into a plurality of slots (slots). Each slot includes 14 consecutive OFDM symbols. Different subcarrier spacings (denoted as Δf) correspond to different OFDM symbol lengths. Therefore, for subcarrier spacings with different values, a time length of one slot is also different.

Figure 3:
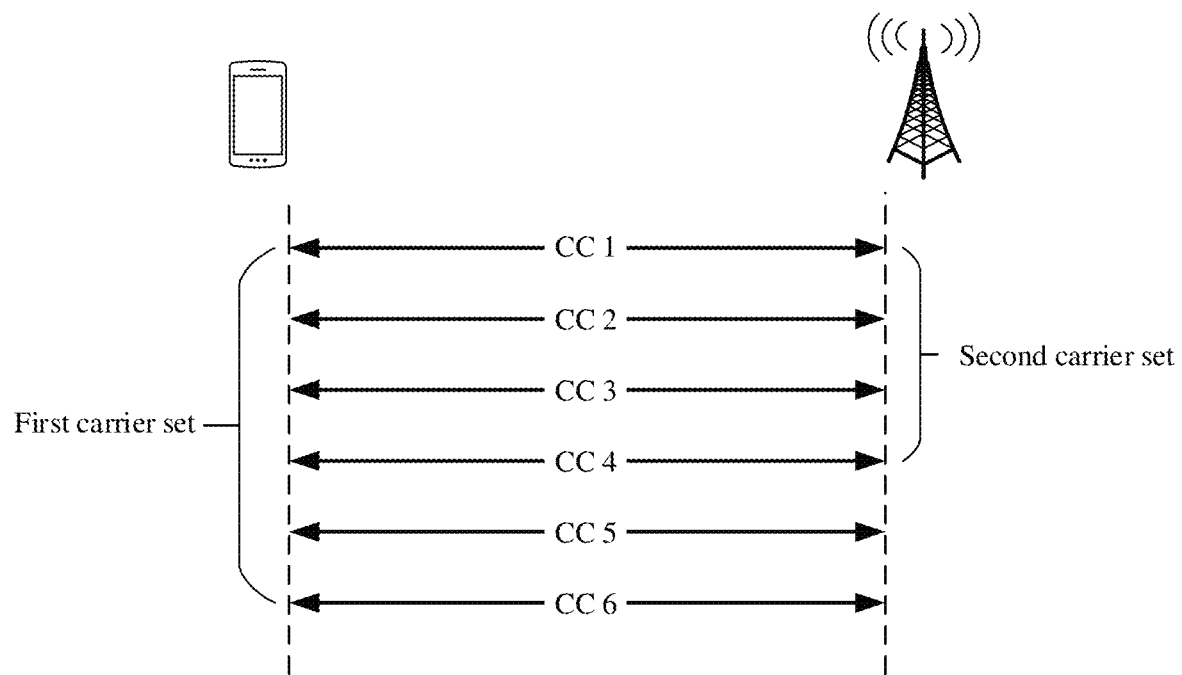
FIG. 3 is a schematic diagram of a configuration of a carrier of a wireless communication system according to an embodiment of this application.

FIG. 3 is a schematic diagram of a configuration of a carrier of a wireless communication system according to an embodiment of this application. In the wireless communication system, a base station configures two carrier sets for a terminal, and the two carrier sets are denoted as a first carrier set and a second carrier set. The first carrier set is used for downlink carrier aggregation, and the second carrier set is used for uplink carrier aggregation. Carriers included in the two carrier sets are partially the same, or is all the same.

As shown in FIG. 3, the first carrier set includes six component carriers (component carriers, CCs), which are successively denoted as a CC 1 to a CC 6. The second carrier set includes four component carriers, including the CC 1 to the CC 4. Quantities of CCs included in the first carrier set and the second carrier set are merely an example. In this embodiment of this application, the first carrier set and the second carrier set alternatively includes other quantities of CCs. The CCs are consecutive or inconsecutive in frequency domain. Different CCs are on a same frequency band, and corresponds to intra-band carrier aggregation (intra-band CA). Alternatively, different CCs are on different frequency bands, and corresponds to inter-band carrier aggregation (inter-band CA).

In this application, one component carrier corresponds to one serving cell (serving cell) of the terminal. In a Chinese context, the component carrier is also translated as a member carrier, and is briefly referred to as a carrier; and the serving cell is briefly referred to as a cell. Unless otherwise specified, in this application, terms "carrier", "component carrier", "aggregated carrier", "aggregated component carrier", "serving cell", "cell", "one of a PCell or an SCell", and "one of a PCC or an SCC" is used interchangeably.

The method and the apparatus provided in the embodiments of this application is applied to a carrier aggregation scenario and a sounding reference signal (sounding reference signal, SRS) carrier switching scenario, to implement fast SRS carrier switching. An SRS switching operation is also sometimes referred to as SRS carrier switching, SRS switching, or carrier switching. For example, in FIG. 3, the second carrier set configured by the base station for the terminal includes four CCs. However, the terminal are not able to send SRSs on the four CCs at the same time. Therefore, the SRS switching operation are performed. The terminal firsts send data or an SRS on the CC 1, then switch to the CC 2, and finally send an SRS on the CC 2. In a process of switching from the CC 1 to the CC 2, data transmission of the CC 1 is interrupted. Longer data transmission interruption time causes greater impact on system performance. Therefore, reduction of data transmission interruption time caused by the SRS switching operation is useful.

Figure 4:
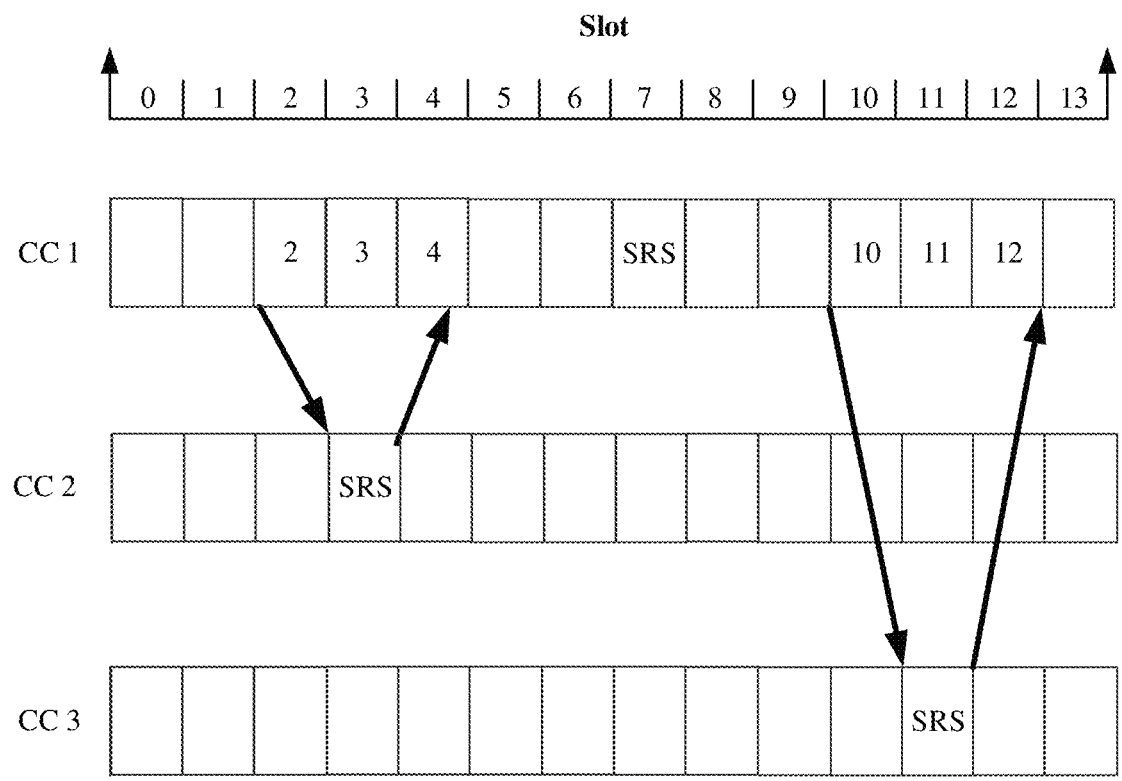
FIG. 4 is a schematic flowchart of an SRS switching operation according to an embodiment of this application.

FIG. 4 is a schematic flowchart of an SRS switching operation according to an embodiment of this application. FIG. 4 shows an example in which a terminal performs the SRS switching operation between three carriers in one slot. As shown in FIG. 4, one slot includes 14 OFDM symbols, which are denoted as a symbol 0 to a symbol 13. A base station configures three CCs for the terminal, which are a CC 1, a CC 2, and a CC 3. First, the terminal sends data on the CC 1 in the symbol 0 and a symbol 1. Second, after data sending on the symbol 2 ends, the terminal switches to the CC 2, and sends an SRS on the CC 2 in the symbol 3. Third, the terminal switches back to the CC 1 in the symbol 4, and sends data and an SRS on the CC 1 in the symbol 5 to the symbol 9. Fourth, the terminal switches to the CC 3 in the symbol 10, and sends an SRS on the CC 3 in the symbol 11.

Finally, the terminal switches back to the CC 1 in the symbol 12, and sends data on the CC 1 in the symbol 13.

In the example in FIG. 4, the terminal sends the data and the SRSs through a same radio frequency transmit channel. When the terminal sends the data or the SRS on the CC 1, the radio frequency transmit channel adapts to a frequency of the CC 1. When the terminal separately switches to the CC 2 and the CC 3, the radio frequency transmit channel also separately adapts to a frequency of the CC 2 and a frequency of the CC 3. Because the frequencies of the CC 1, the CC 2, and the CC 3 are different, time is taken to adjust a frequency to which the radio frequency transmit channel of the terminal adapts from one frequency to another frequency. The time is denoted as a radio frequency adjusting time or a radio frequency retuning time (RF retuning time). The radio frequency retuning time is also referred to as a radio frequency retuning delay (RF retuning delay) or a radio frequency retuning gap (RF retuning gap). For ease of description, the following uses the radio frequency retuning time for description.

In FIG. 4, data transmission on the CC 1 is used as an example. In an SRS switching process, the data transmission is interrupted. As described above, the data transmission interruption time includes the radio frequency retuning time. Therefore, reducing the radio frequency retuning time reduces the data transmission interruption time, and help improve system performance. The radio frequency retuning time is related to software and hardware configurations of the terminal, especially to software and hardware configurations for radio frequency processing of the terminal.

Figure 5:
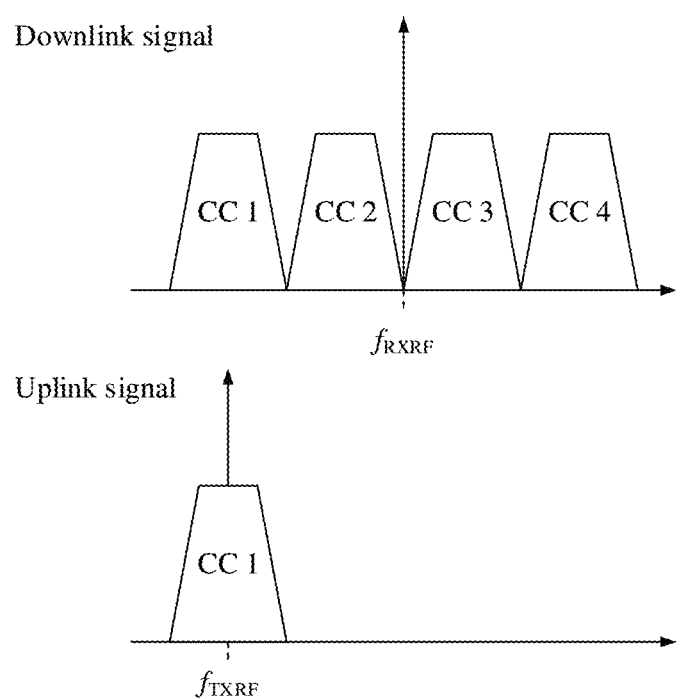
FIG. 5 is a schematic diagram of an uplink carrier and a downlink carrier according to an embodiment of this application.

Currently, before the terminal sends an uplink signal, the terminal directly mixes a baseband signal of a zero intermediate frequency (Zero Intermediate Frequency, ZIF) with a local oscillator signal provided by a PLL, to generate a radio frequency transmit signal. Correspondingly, after receiving a downlink signal, the terminal directly mixes a radio frequency received signal with the local oscillator signal provided by the PLL, to obtain the baseband signal with the zero intermediate frequency. In an FDD system, both the downlink signal received by the terminal and the uplink signal sent by the terminal are located on a same carrier. Therefore, a center frequency of the uplink signal is the same as a center frequency of the downlink signal. The terminal is configured to use the PLL to provide local oscillator signals of a same frequency for the uplink signal and the downlink signal at the same time. When the terminal supports a carrier aggregation scenario, a quantity of uplink CCs scheduled by the base station for the terminal is different from a quantity of downlink CCs scheduled by the base station for the terminal. In this case, the center frequency of the uplink signal of the terminal is different from the center frequency of the downlink signal of the terminal. For example, as shown in FIG. 5, an uplink carrier scheduled by the base station for the terminal is a CC 1, and a center frequency of the CC 1 is $f_{TXRF}$. Downlink carriers scheduled by the base station for the terminal are a CC 1 to a CC 4, and center frequencies of the carriers are $f_{RXRF}$. In this case, when the terminal sends an uplink signal, a frequency of the local oscillator signal that is provided by the PLL is $f_{TXRF}$; and when the terminal receives a downlink signal, the frequency of the local oscillator signal that is provided by the PLL is $f_{RXRF}$. In other words, the PLL provides local oscillator signals of different frequencies. Similar to sending an SRS, in an example in FIG. 5, when the terminal sends data on the CC 1, the frequency of the local oscillator signal provided by the PLL is $f_{RXRF}$. When the terminal switches to the CC 1 to the CC 4 to receive data, the frequency of the local oscillator signal provided by the PLL is/TXRF. Because $f_{RXRF}$ is different from $f_{TXRF}$, time is taken to adjust a frequency to which the PLL of the terminal is adapted from one frequency to another frequency. In this process, data transmission is interrupted. According to the method and apparatus provided in the embodiments of this application, the foregoing problem is solved. The following provides detailed descriptions.

Figure 6:
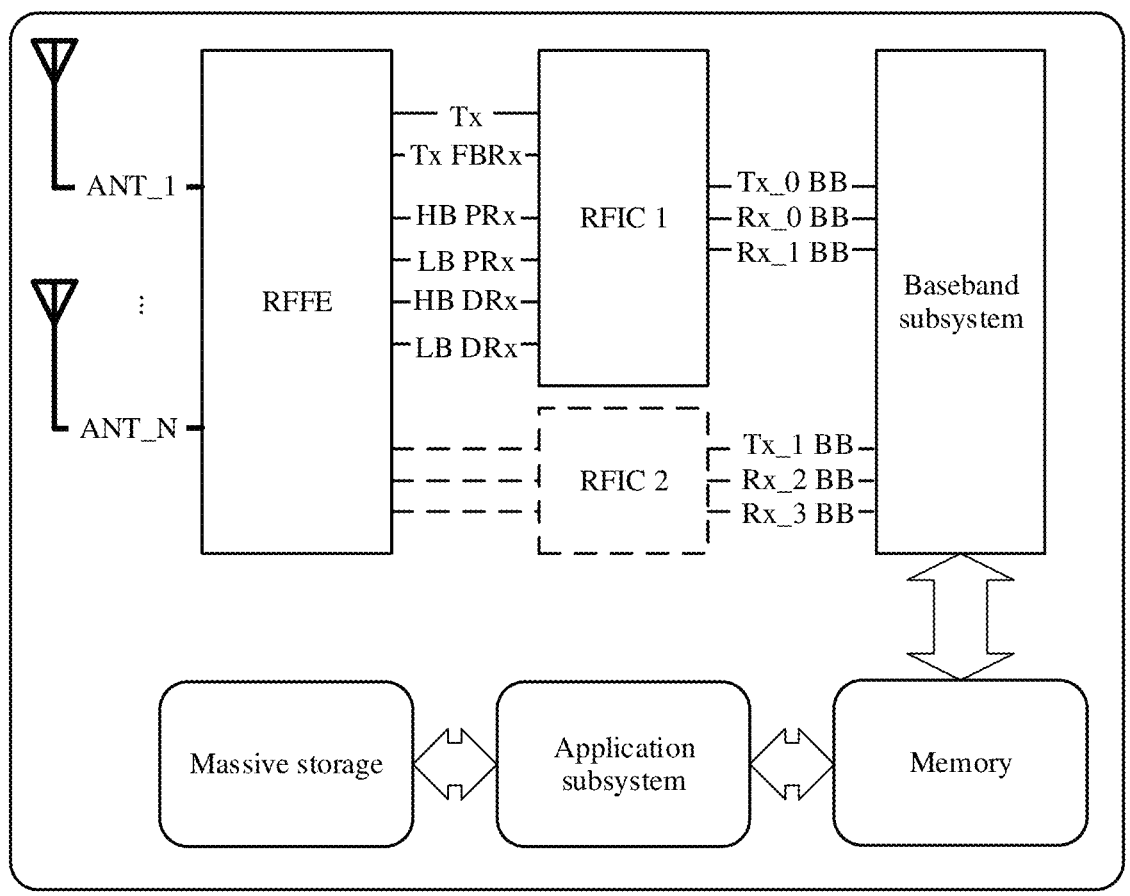
FIG. 6 is a schematic diagram of a structure of a wireless communication apparatus according to an embodiment of this application.

FIG. 6 is a schematic diagram of a structure of a wireless communication apparatus according to an embodiment of this application. The wireless communication apparatus are the terminal or the base station in the embodiments of this application. As shown in FIG. 6, the wireless communication apparatus includes an application subsystem, a memory (memory), a massive storage (massive storage), a baseband subsystem, a radio frequency integrated circuit (radio frequency integrated circuit, RFIC), a radio frequency front end (radio frequency front end, RFFE) component, and antennas (antennas, ANTs). The components are coupled to each other through various interconnection buses or in other electrical connection manners.

In FIG. 6, ANT_1 represents the first antenna, the rest is deduced by analogy, and ANT_N represents an $N^{th}$ antenna, where N is a positive integer greater than 1. Tx represents a transmit path, and Rx represents a receive path. Different numbers represent different paths. FBRx represents a feedback receive path, PRx represents a receive path, and DRx represents a diversity receive path. HB represents a high band, LB represents a low band, and HB or LB indicates that a band is comparatively high or low. BB represents a baseband. Marks and components in FIG. 6 are merely used for illustration, and are merely used as a possible implementation. This embodiment of this application further includes another implementation.

The application subsystem is used as a main control system or a main computing system of the wireless communication apparatus, and is configured to run a main operating system and an application program, manage software and hardware resources of the entire wireless communication apparatus, and provide a user operation interface for a user. The application subsystem includes one or more processing cores. In addition, the application subsystem further includes driver software related to another subsystem (for example, the baseband subsystem). The baseband subsystem also includes one or more processing cores, hardware accelerators (hardware accelerators, HACs), a cache, and the like.

In FIG. 6, the RFFE component and RFIC 1 (and optionally RFIC 2) jointly forms a radio frequency subsystem. The radio frequency subsystem further are divided into a radio frequency receive channel (RF receive path) and a radio frequency transmit channel (RF transmit path). The radio frequency receive channel receives a radio frequency signal through the antenna, perform processing (such as amplification, filtering, and down-conversion) on the radio frequency signal to obtain a baseband signal, and transfer the baseband signal to the baseband subsystem. The radio frequency transmit channel receives the baseband signal from the baseband subsystem, perform radio frequency processing (such as up-conversion, amplification, and filtering) on the baseband signal to obtain a radio frequency signal, and finally radiate the radio frequency signal into space through the antenna. The radio frequency subsystem includes electronic components such as an antenna switch, an antenna tuner, a low-noise amplifier (low-noise amplifier, LNA), a power amplifier (power amplifier, PA), a frequency mixer (mixer), a local oscillator (local oscillator, LO), and a filter (filter). The electronic components are integrated into one or more chips based on a condition. The antenna is also sometimes considered as a part of the radio frequency subsystem.

The baseband subsystem extracts useful information or data bits from the baseband signal, or convert information or data bits into a to-be-sent baseband signal. The information or data bits are data that represents user data or control information such as a voice, a text, or video. For example, the baseband subsystem implements modulation and demodulation, encoding and decoding, and other signal processing operations. Different radio access technologies, such as 5G NR and 4G LTE, usually have different baseband signal processing operations. Therefore, the baseband subsystem includes the plurality of processing cores or the plurality of HACs, to support convergence of a plurality of mobile communication modes.

In addition, because the radio frequency signal is an analog signal, and the baseband subsystem mainly processes a digital signal, an analog-to-digital conversion component is further configured for use in the wireless communication apparatus. The analog-to-digital conversion component includes an analog-to-digital converter (analog-to-digital converter, ADC) that converts an analog signal into a digital signal, and a digital-to-analog converter (digital-to-analog converter, DAC) that converts a digital signal into an analog signal. In this embodiment of this application, the analog-to-digital conversion component is disposed in the baseband subsystem, or is disposed in the radio frequency subsystem.

In this embodiment of this application, the processing core represents a processor; and the processor is a general-purpose processor, or is a processor designed for a specific field. For example, the processor is a central processing unit (central processing unit, CPU), or is a digital signal processor (digital signal processor, DSP). Alternatively, the processor is a microcontrol unit (microcontrol unit, MCU), a graphics processing unit (graphics processing unit, GPU), an image signal processor (image signal processor, ISP), an audio signal processor (audio signal processor, ASP), or a processor specially designed for an artificial intelligence (artificial intelligence, AI) application. The AI processor includes but is not limited to a neural network processing unit (neural network processing unit, NPU), a tensor processing unit (tensor processing unit, TPU), and a processor referred to as an AI engine.

The hardware accelerator is configured to implement some sub-functions with comparatively large processing overheads, for example, assembly, parsing, encryption, and decryption of a data packet (data packet). The sub-functions is also implemented by using a processor having a common function. However, for consideration of performance or costs to use the hardware accelerator to implement the sub-functions is useful. Therefore, a type and a quantity of hardware accelerators are selected based on a condition. In a specific implementation, one or a combination of a field programmable gate array (field programmable gate array, FPGA) and an application-specific integrated circuit (application-specific integrated circuit, ASIC) is used for implementation. Certainly, one or more processing cores is also used in the hardware accelerator.

The memory is classified into a volatile memory (volatile memory) and a non-volatile memory (non-volatile memory, NVM). The volatile memory is a memory in which data stored in the memory will be lost after a power supply is interrupted. Currently, volatile memories are mainly random access memories (random access memories, RAMs), and include a static random access memory (static RAM, SRAM) and a dynamic random access memory (dynamic RAM, DRAM). The non-volatile memory is a memory in which data stored in the memory is not lost even if the power supply is interrupted. Common non-volatile memories include a read-only memory (read-only memory, ROM), an optical disc, a magnetic disk, various memories based on a flash memory (flash memory) technology, and the like. Usually, the volatile memory is selected as the memory, and the non-volatile memory, for example, the magnetic disk or a flash memory, is selected as the massive storage.

In this embodiment of this application, the baseband subsystem and the radio frequency subsystem jointly form a communication subsystem, to provide a wireless communication function for the wireless communication apparatus. Usually, the baseband subsystem is responsible for managing software and hardware resources of the communication subsystem, and configures a working parameter of the radio frequency subsystem. The one or more processing cores of the baseband subsystem is integrated into one or more chips, and the chip is referred to as a baseband processing chip or a baseband chip. Similarly, the RFIC is referred to as a radio frequency processing chip or a radio frequency chip. In addition, with evolution of technologies, function division of the radio frequency subsystem and the baseband subsystem in the communication subsystem alternatively is adjusted. For example, some functions of the radio frequency subsystem are integrated into the baseband subsystem, or some functions of the baseband subsystem are integrated into the radio frequency subsystem. In an actual application, based on a condition for an application scenario, the wireless communication apparatus is configured to use a combination of different quantities of processing cores and different types of processing cores.

In this embodiment of this application, the radio frequency subsystem includes an independent antenna, an independent radio frequency front-end (RF front-end, RFFE) component, and an independent radio frequency chip. The radio frequency chip is also sometimes referred to as a receiver (receiver), a transmitter (transmitter), or a transceiver (transceiver). The antenna, the radio frequency front-end component, and the radio frequency processing chip is manufactured and sold separately. Certainly, the radio frequency subsystem also is configured to use different components or different integration manners based on conditions for power consumption and performance. For example, the radio frequency front-end component is integrated into the radio frequency chip, or even both the antenna and the radio frequency front end component are integrated into the radio frequency chip, and the radio frequency chip is also sometimes referred to as a radio frequency antenna module or an antenna module.

In this embodiment of this application, the baseband subsystem is used as an independent chip, and the chip is referred to as a modem (modem) chip. A hardware component in the baseband subsystem is manufactured and sold as a modem chip. The modem chip is also sometimes referred to as a baseband chip or a baseband processor. In addition, the baseband subsystem further are integrated into a SoC chip, and is manufactured and sold as the SoC chip. A software component of the baseband subsystem is built in the hardware component before delivery, is imported from another non-volatile memory into the hardware component after delivery, or is downloaded and updated in an online manner through a network.

Figure 7:
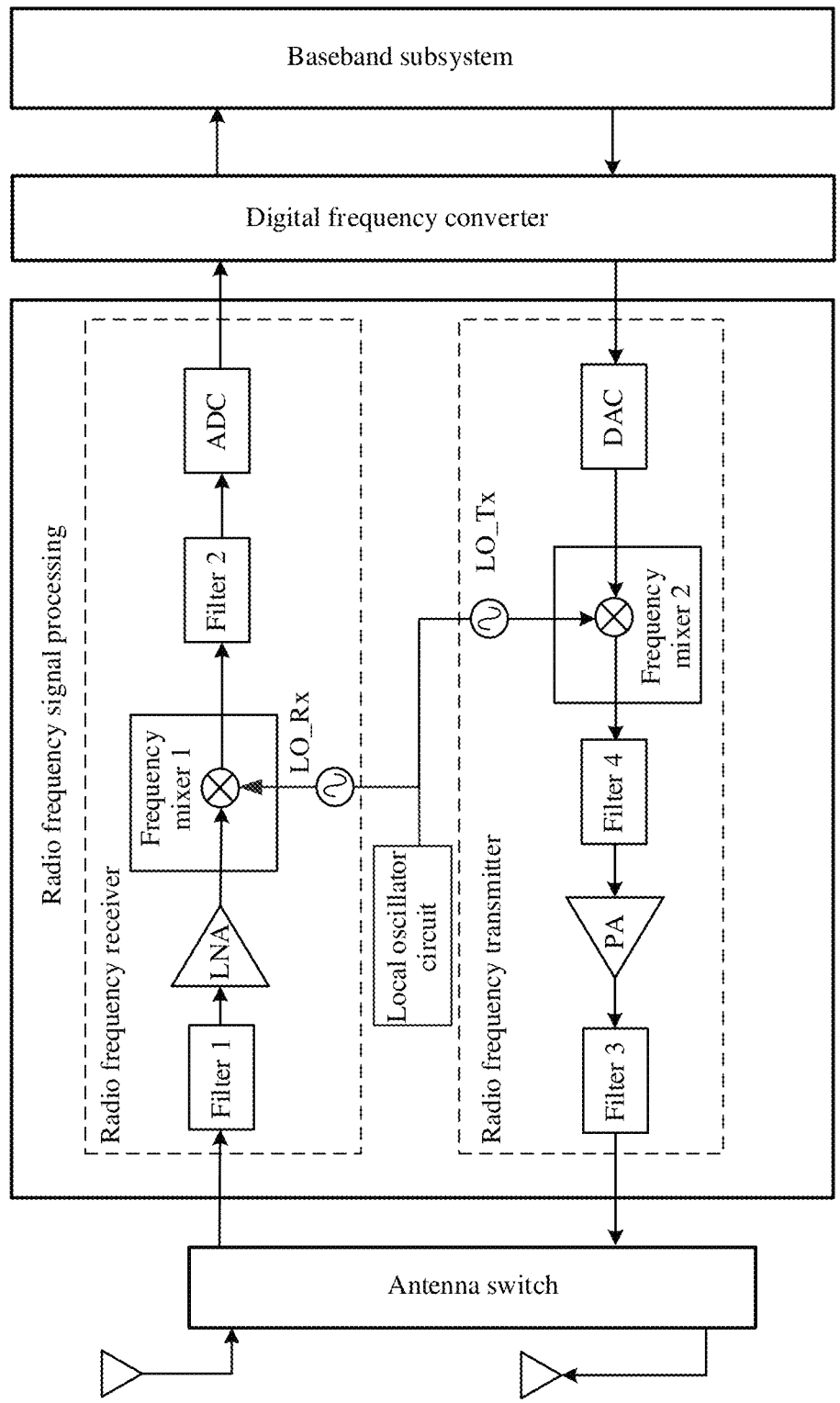
FIG. 7 is a schematic diagram of a structure of another wireless communication apparatus according to an embodiment of this application.

FIG. 7 is a schematic diagram of a structure of another wireless communication apparatus according to an embodiment of this application. FIG. 7 shows some common components used for radio frequency signal processing in the wireless communication apparatus. Although FIG. 7 show one radio frequency receive channel and one radio frequency transmit channel, the wireless communication apparatus in this embodiment of this application is not limited thereto. The wireless communication apparatus includes one or more radio frequency receive channels and radio frequency transmit channels. The radio frequency receive channel includes modules such as a radio frequency receiver, and the radio frequency transmit channel includes modules such as a radio frequency transmitter. Other content included in the radio frequency receive channel and the radio frequency transmit channel are not listed one by one herein in this embodiment of this application.

In FIG. 7, a local oscillator circuit is configured to provide local oscillator signals of a same frequency for the radio frequency transmitter and the radio frequency receiver.

For the radio frequency receive channel, the radio frequency receiver in the radio frequency receive channel receives a second signal on a second carrier based on the local oscillator signal provided by the local oscillator circuit. A received signal is processed in the following manner: After a radio frequency signal received from an antenna selected by an antenna switch is filtered by a filter 1, a filtered radio frequency signal is sent to the radio frequency receive channel. Because the radio frequency signal received from the antenna is usually very weak, LNA amplification is usually performed on the signal. An amplified signal is first down-converted by a frequency mixer 1, and passes through a filter 2 and an analog-to-digital converter (analog-to-digital converter, ADC). Finally, a signal obtained through processing by a digital frequency converter is input to a baseband subsystem, and the baseband subsystem completes baseband signal processing.

For the radio frequency transmit channel, the radio frequency receiver in the radio frequency transmit channel sends a first signal on a first carrier based on the local oscillator signal provided by the local oscillator circuit. A signal is sent in the following manner: A baseband signal obtained through processing by the digital frequency converter is converted into an analog signal by using a digital-to-analog converter (digital-to-analog converter, DAC), and the analog signal is converted into a radio frequency signal through up-conversion processing performed by a frequency mixer 2. The radio frequency signal is processed by a filter 4, a PA, and a filter 3, and is finally radiated outward from an antenna selected by the antenna switch.

The digital frequency converter is configured to provide a digital frequency conversion operation to compensate for a frequency difference between a center frequency of the first carrier and a center frequency of the second carrier. The digital frequency converter is configured to perform a frequency conversion operation on a digital signal (for example, a digital baseband signal). Compared with an analog frequency conversion operation provided by a frequency mixer, the frequency conversion operation performed by the digital frequency converter calls for less time and has higher efficiency. In a specific implementation, the digital frequency conversion operation includes a frequency shift operation, for example, multiplying a to-be-transmitted digital baseband signal and a preset frequency offset or a phase offset, to obtain a digital frequency conversion signal. A frequency of the digital frequency conversion signal has a specific offset relative to the digital baseband signal in frequency domain. In addition, the digital frequency conversion operation further includes signal bandwidth adjustment. This are implemented by changing a sampling rate of a signal.

In this embodiment of this application, a bandwidth of the first carrier is the same as or be different from a bandwidth of the second carrier. When the bandwidth of the first carrier is different from the bandwidth of the second carrier, in a possible implementation, the first carrier includes one component carrier, and the second carrier includes a plurality of component carriers. In another possible implementation, the first carrier includes a plurality of component carriers, and the second carrier includes one component carrier.

When the bandwidth of the first carrier is different from the bandwidth of the second carrier, a frequency of the local oscillator signal provided by the local oscillator circuit remains unchanged. In this case, the frequency of the local oscillator signal provided by the local oscillator circuit is equal to the center frequency of the first carrier, or is equal to the center frequency of the second carrier. This is not limited in this embodiment of this application.

In a first possible scenario, when the frequency of the local oscillator signal provided by the local oscillator circuit is equal to the center frequency of the first carrier, the digital frequency converter converts the second signal into a baseband signal by performing the digital frequency conversion operation, where a frequency switching range of the digital frequency conversion operation is the frequency difference between the center frequency of the first carrier and the center frequency of the second carrier.

In a second possible scenario, when the frequency of the local oscillator signal provided by the local oscillator circuit is equal to the center frequency of the second carrier, the digital frequency converter converts a baseband signal into the first signal by performing the digital frequency conversion operation, where a frequency switching range of the digital frequency conversion operation is the frequency difference between the center frequency of the first carrier and the center frequency of the second carrier.

Certainly, the foregoing is merely an example. The frequency of the local oscillator signal provided by the local oscillator circuit alternatively is between the center frequency of the first carrier and the center frequency of the second carrier; be greater than the maximum value in the center frequency of the first carrier and the center frequency of the second carrier; or be less than the minimum value in the center frequency of the first carrier and the center frequency of the second carrier.

Further, optionally, in this embodiment of this application, both the first carrier and the second carrier are TDD carriers, and the first carrier and the second carrier are located on a same frequency band.

In FIG. 7, in the frequency mixer 1, frequency mixing is performed on an input signal and the local oscillator (Local Oscillator, LO) signal provided by the local oscillator circuit, to implement a down-conversion operation. In the frequency mixer 2, frequency mixing is performed on an input signal and the LO signal provided by the local oscillator circuit, to implement an up-conversion operation. The local oscillator is a common term in the radio frequency field. The local oscillator is also sometimes referred to as a frequency synthesizer (frequency synthesizer). A main function of the local oscillator or the frequency synthesizer is to provide a signal of a specific frequency, namely, a local oscillator signal, for radio frequency processing. A local oscillator signal of a high frequency is implemented by using a local oscillator circuit, for example, a phase locked loop (phase locked loop, PLL) or a delay locked loop (delay locked loop, DLL). A local oscillator signal of a low frequency is implemented by directly using a crystal oscillator, or be implemented by performing frequency division on a signal of a high frequency generated by the local oscillator circuit such as the PLL.

The wireless communication apparatus shown in FIG. 7 further includes the baseband subsystem, and the baseband subsystem is configured to process the baseband signal. A specific structure and function of the baseband subsystem are not limited in this embodiment of this application. For details, refer to descriptions in the conventional technology. Details are not described herein again.

In this embodiment of this application, the digital frequency converter, the radio frequency receiver, and the radio frequency transmitter is integrated into a same integrated circuit chip. In this way, a signal bandwidth on an interface between the baseband subsystem and the radio frequency receiver or the radio frequency transmitter is reduced, and transmission load on the interface is reduced. When the digital frequency converter, the radio frequency receiver, and the radio frequency transmitter are integrated into the same integrated circuit chip, the digital frequency converter includes a first digital frequency converter and a second digital frequency converter, the first digital frequency converter is coupled to the radio frequency transmitter, and the second digital frequency converter is coupled to the radio frequency receiver. For details, refer to FIG. 8.

Figure 8:
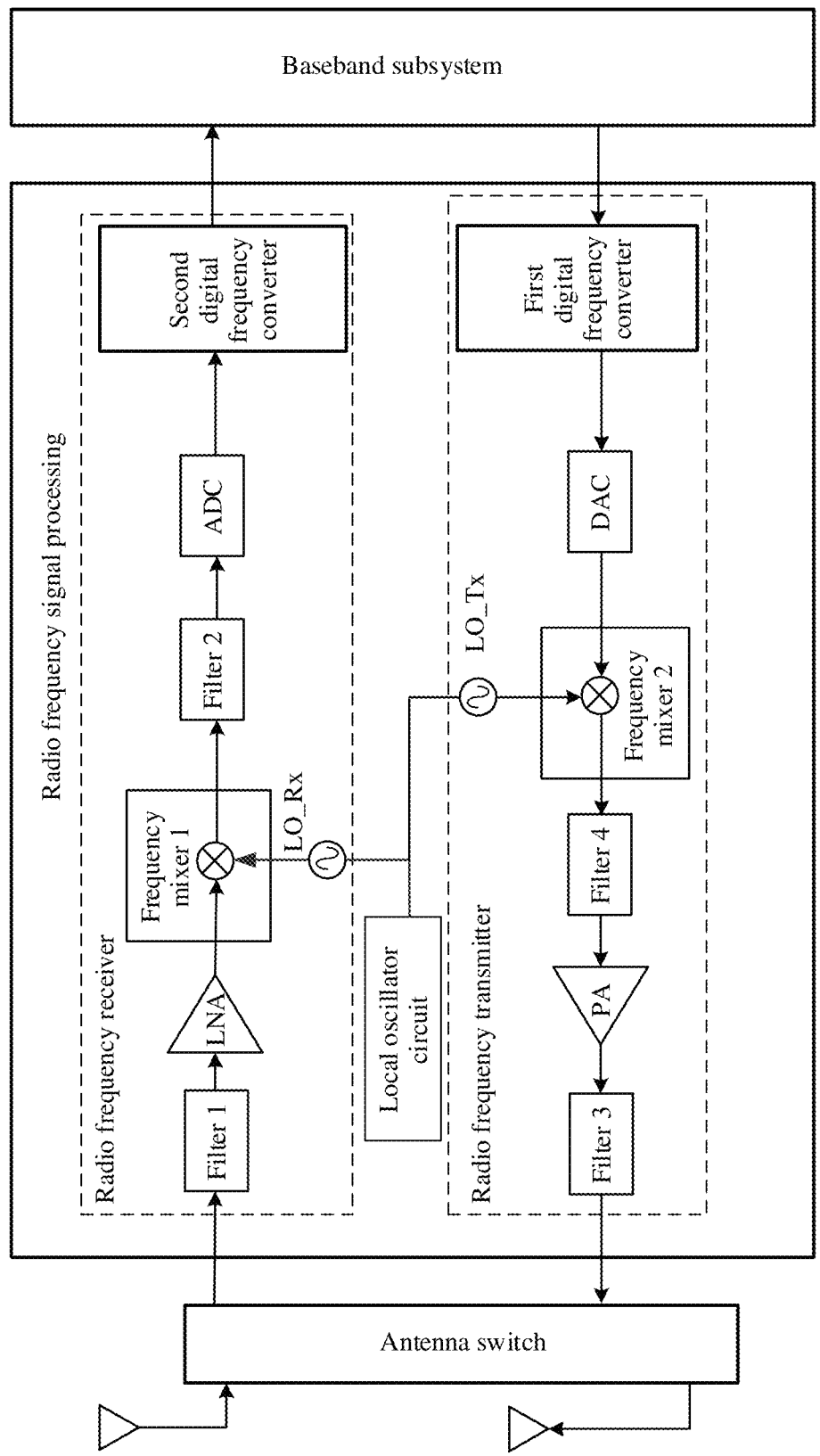
FIG. 8 is a schematic diagram of a structure of another wireless communication apparatus according to an embodiment of this application.

FIG. 8 is a schematic diagram of a structure of another wireless communication apparatus according to an embodiment of this application. FIG. 8 shows some common components used for radio frequency signal processing in the wireless communication apparatus. Although FIG. 8 shows one radio frequency receive channel and one radio frequency transmit channel, the wireless communication apparatus in this embodiment of this application is not limited thereto. The wireless communication apparatus includes one or more radio frequency receive channels and radio frequency transmit channels.

For ease of description, the following uses an example in which the wireless communication apparatus sends a signal on a first carrier and receives a signal on a second carrier for description. A bandwidth of the first carrier is different from a bandwidth of the second carrier. For example, in a possible implementation, the first carrier includes one component carrier, and the second carrier includes a plurality of component carriers. In another possible implementation, the first carrier includes a plurality of component carriers, and the second carrier includes one component carrier. Certainly, the bandwidth of the first carrier alternatively is the same as the bandwidth of the second carrier. Details are separately described below.

With reference to FIG. 8, in a first possible scenario, the bandwidth of the first carrier is less than the bandwidth of the second carrier. In this scenario, a frequency of a local oscillator signal provided by a local oscillator circuit is equal to a center frequency of the second carrier. In this case, for the radio frequency receive channel, a signal received from the second carrier is processed in a manner in the conventional technology. A second digital frequency converter coupled to a radio frequency receiver directly outputs an input signal without performing spectrum shift processing on the input signal.

For the radio frequency transmit channel, a first digital frequency converter performs processing such as a spectrum shift on an input signal first baseband signal, and outputs a first digital frequency conversion signal. A frequency of the first digital frequency conversion signal is equal to a difference between a center frequency of the first carrier and the frequency of the local oscillator signal.

Figure 9:
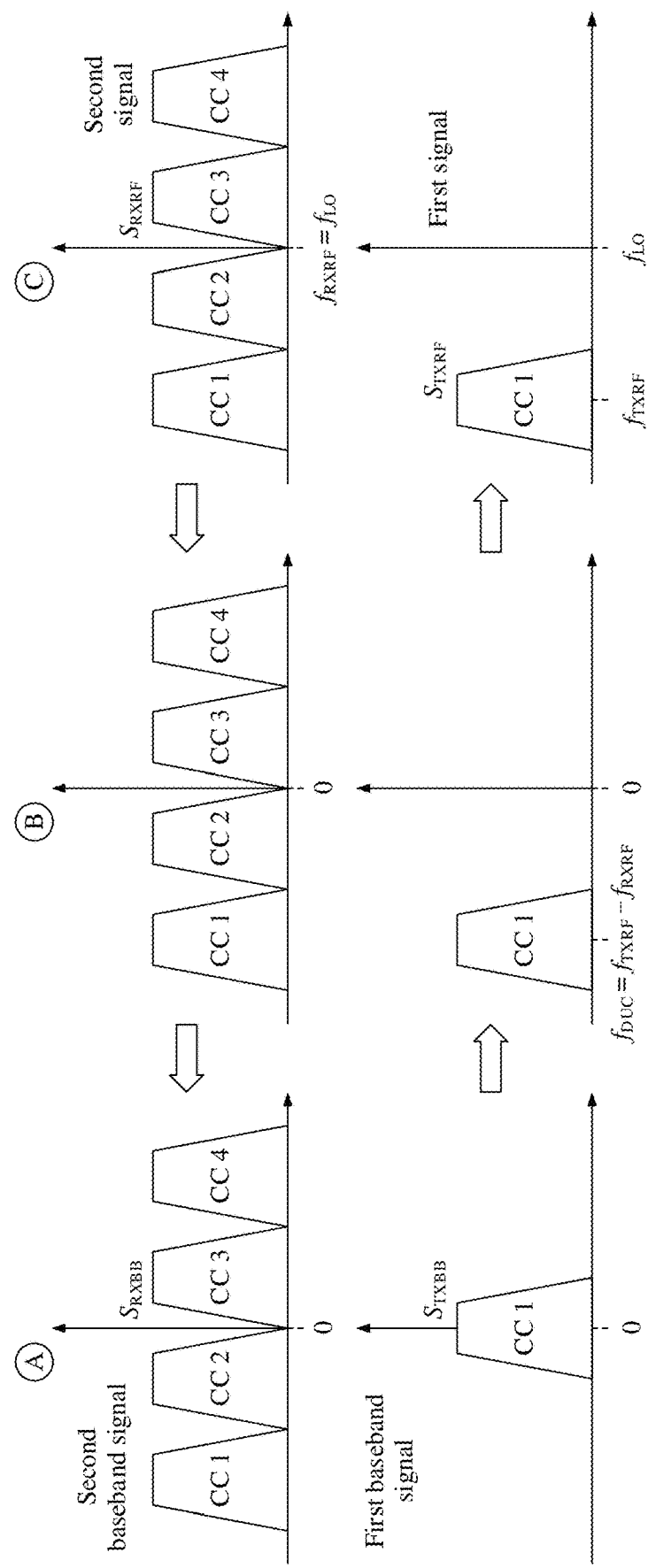
FIG. 9 is a schematic diagram of a carrier spectrum according to an embodiment of this application.

For example, as shown in FIG. 9, the second carrier includes four CCs, which are represented as a CC 1, a CC 2, a CC 3, and a CC 4. The first carrier includes one CC, which is represented as a CC 1. The center frequency of the second carrier is $f_{RXRF}$, and the center frequency of the first carrier is $f_{TXRF}$. In this scenario, the frequency of the local oscillator signal provided by the local oscillator circuit is $f_{LO}=f_{RXRF}$. In this case, for the radio frequency receive channel, the radio frequency receiver directly shifts a spectrum of a second signal received from the second carrier to a baseband based on the local oscillator signal provided by the local oscillator circuit in the processing manner in the conventional technology, to obtain a second baseband signal $S_{RXBB}$. In other words, in this case, a working manner of the radio frequency receiver is the same as that of a conventional zero intermediate frequency receiver.

For the radio frequency transmit channel, because a radio frequency transmitter and the radio frequency receiver share one local oscillator circuit, and the local oscillator circuit provides the radio frequency transmitter and the radio frequency receiver the local oscillator signal whose frequency is $f_{RXRF}$, the radio frequency transmitter cannot directly shift a center frequency of the first baseband signal $S_{TXBB}$ to an expected center frequency, namely, the center frequency $f_{TXRF}$ of the first carrier. In this scenario, the center frequency of the first baseband signal $S_{TXBB}$ is first shifted to $f_{DUC}$ by using the first digital frequency converter to obtain the first digital frequency conversion signal. The center frequency of the first digital frequency conversion signal is $f_{DUC}$, and $f_{DUC}$ is the difference between the center frequency of the first carrier and the frequency of the local oscillator signal. In other words, the following formula is met: $f_{DUC}=f_{TXRF}-f_{RXRF}=f_{TXRF}-f_{LO}$.

On this basis, a second spectrum shift is performed by using the radio frequency transmitter. Because the frequency of the local oscillator signal used by the radio frequency transmitter is $f_{LO}$, a center frequency of a first signal $S_{TXRF}$ obtained after the second spectrum shift is $f_{TXRF}$. In other words, the following formula is met: $f_{DUC}+f_{LO}=(f_{TXRF}-f_{LO})+f_{LO}=f_{TXRF}$.

It is learned from the foregoing process that the radio frequency transmitter shifts the center frequency of the first baseband signal $S_{TXBB}$ to the center frequency $f_{TXRF}$ expected by the radio frequency transmitter by performing the two frequency spectrum shifts.

With reference to the foregoing description, when the apparatus shown in FIG. 8 is applied to a TDD-LTE communication system, a bandwidth of each of the four CCs included in the second carrier is 20 MHz, and center frequencies of the four CCs are 2470 MHZ, 2490 MHz, 2510 MHZ, and 2530 MHz. A bandwidth of the one CC included in the first carrier is 20 MHZ, and a center frequency of the CC is 2470 MHz. In this case, a center frequency $f_{RXRF}$ of the second signal received by the radio frequency receiver from the second carrier is $f_{RXRF}=2500$ MHZ.

Correspondingly, the center frequency $f_{TXRF}$ of the first signal sent by the radio frequency transmitter on the first carrier is $f_{TXRF}=2470$ MHz.

In this scenario, the frequency of the local oscillator signal provided by the local oscillator circuit is $f_{LO}=f_{RXRF}=2500$ MHZ.

For the radio frequency receive channel, after passing through a radio frequency mixer, the second signal received by the radio frequency receiver from the second carrier is shifted to the baseband as a whole, which is the same as that in the conventional technology. Details are not described herein again.

For the radio frequency transmit channel, the first baseband signal output by a baseband subsystem first undergoes the spectrum shift performed by the first digital frequency converter to obtain the first digital frequency conversion signal, where the center frequency $f_{DUC}$ of the first digital frequency conversion signal is $f_{DUC}=f_{TXRF}-f_{RXRF}=2470$ MHZ−2500 MHZ=−30 MHz.

The radio frequency transmitter performs the spectrum shift on the first digital frequency conversion signal based on the local oscillator signal provided by the local oscillator circuit, to obtain the first signal, where the center frequency $f_{TXRF}$ of the first signal is $f_{TXRF}=f_{DUC}+f_{LO}=-30$ MHz+2500 MHz=2470 MHz.

It is learned from the foregoing process that the center frequency of the first signal obtained through processing of the radio frequency transmitter is the same as the center frequency of the first carrier. Therefore, the radio frequency transmitter sends the first signal on the first carrier.

In the foregoing process, when the bandwidth of the second carrier is greater than the bandwidth of the first carrier, the local oscillator circuit does not switch the frequency of the output local oscillator signal. In other words, when the radio frequency transmitter sends an uplink signal and when the radio frequency receiver receives a downlink signal, the frequency of the output local oscillator signal remains unchanged, and the frequency difference between the center frequency of the first carrier and the center frequency of the second carrier is compensated by using the first digital frequency converter. This avoids a problem that data transmission is interrupted when the local oscillator circuit switches the frequency of the output local oscillator signal.

In a second possible scenario, the bandwidth of the first carrier is greater than the bandwidth of the second carrier. In this scenario, the frequency of the local oscillator signal provided by the local oscillator circuit is equal to the center frequency of the first carrier. In this case, for the radio frequency transmit channel, a signal is sent on the first carrier in a manner in the conventional technology. The first digital frequency converter coupled to the radio frequency transmitter directly outputs an input signal without performing spectrum shift processing on the input signal.

For the radio frequency receive channel, the radio frequency receiver performs, based on the local oscillator signal provided by the local oscillator circuit, a spectrum shift on the second signal received from the second carrier, to obtain a second digital frequency conversion signal. A frequency of the second digital frequency conversion signal is equal to a difference between the center frequency of the second carrier and the frequency of the local oscillator signal. The second digital frequency converter then shifts a spectrum of the input second digital frequency conversion signal to a zero intermediate frequency. In this case, a center frequency of the second baseband signal output by the second digital frequency converter based on the second digital frequency conversion signal is zero.

Figure 10:
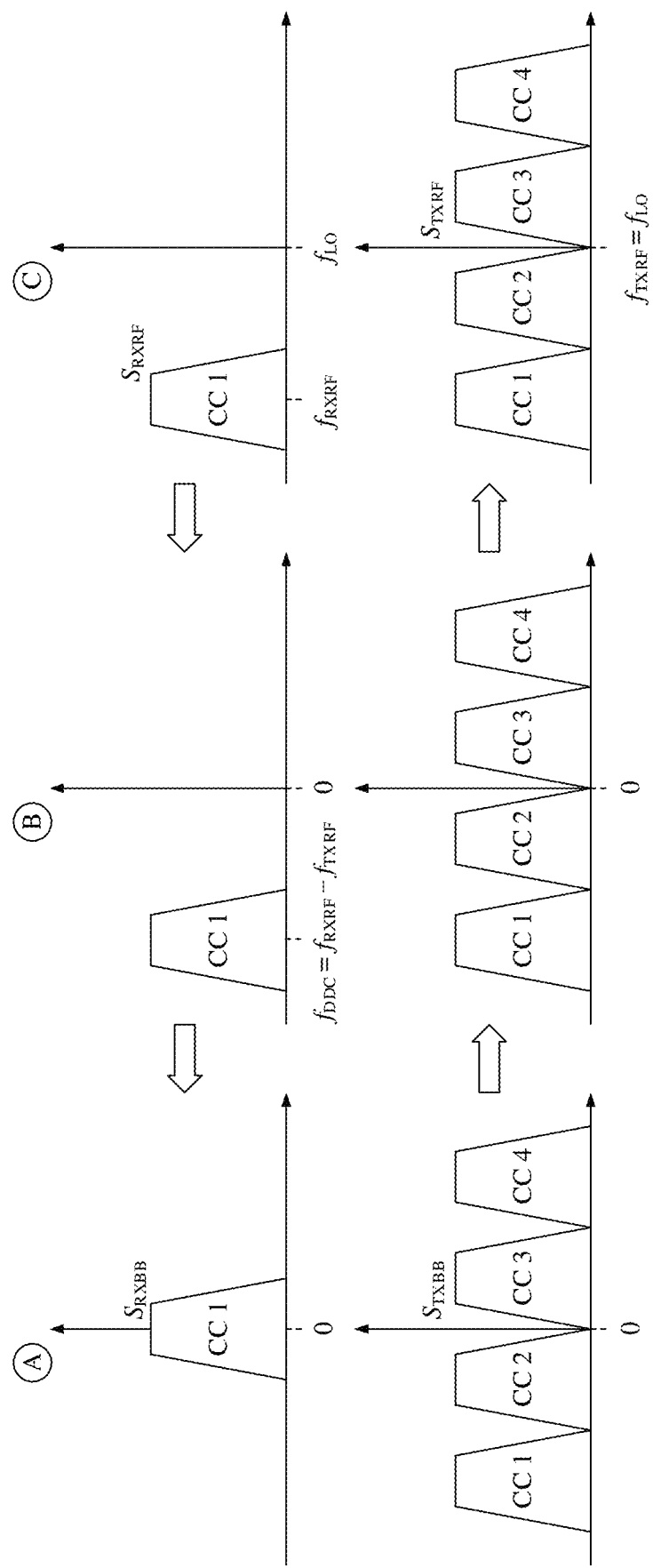
FIG. 10 is a schematic diagram of a carrier spectrum according to an embodiment of this application.

For example, as shown in FIG. 10, the first carrier includes four CCs, which are represented as the CC 1, the CC 2, the CC 3, and the CC 4. The second carrier includes one CC, which is represented as the CC 1.

It is assumed that the center frequency of the second carrier is $f_{RXRF}$, and the center frequency of the first carrier is $f_{TXRF}$. In this scenario, the frequency of the local oscillator signal provided by the local oscillator circuit is $f_{LO}=f_{TXRF}$.

In this case, for the radio frequency transmit channel, the first digital frequency converter coupled to the radio frequency transmitter does not perform the spectrum shift on the input first baseband signal $S_{TXBB}$, and directly outputs the first baseband signal to the radio frequency transmitter. The radio frequency transmitter directly performs the spectrum shift on the first baseband signal $S_{TXBB}$ based on the local oscillator signal provided by the local oscillator circuit in a processing manner in the conventional technology, to obtain the first signal. In this scenario, a working manner of the radio frequency transmitter is the same as that of a conventional zero intermediate frequency transmitter. Details are not described herein again.

For the radio frequency receiver, because the radio frequency transmitter and the radio frequency receiver share the one local oscillator circuit, and the local oscillator circuit provides the radio frequency transmitter and the radio frequency receiver the local oscillator signal whose frequency is $f_{TXRF}$, the radio frequency receiver cannot directly shift the spectrum of the second signal received from the second carrier to the zero intermediate frequency. In this case, the radio frequency receiver shifts the center frequency of the received second signal to an intermediate frequency $f_{DDC}$. That is, $f_{DDC}=f_{RXRF}-f_{LO}=f_{RXRF}-f_{TXRF}$.

On this basis, by using the second digital frequency converter provided in this embodiment of this application, the center frequency of the second signal is further shifted to $f_{DDC}$, so that the center frequency of the second signal is shifted to the zero intermediate frequency of a baseband signal. In other words, the center frequency of the second baseband signal output by the second digital frequency converter is 0.

With reference to the foregoing description, when the apparatus shown in FIG. 8 is applied to the TDD-LTE communication system, the bandwidth of each of the four CCs included in the first carrier is 20 MHz, the center frequencies of the four CCs are 2470 MHZ, 2490 MHz, 2510 MHz, and 2530 MHz. The bandwidth of the one CC included in the second carrier is 20 MHZ, and the center frequency of the CC is 2470 MHZ. In this case, the center frequency $f_{TXRF}$ of the first signal sent by the radio frequency transmitter on the first carrier is $f_{TXRF}=2500$ MHz.

Correspondingly, the center frequency $f_{RXRF}$ of the second signal received by the radio frequency receiver from the second carrier is $f_{RXRF}=2470$ MHz.

In this scenario, the frequency of the local oscillator signal provided by the local oscillator circuit is $f_{LO}=f_{TXRF}=2500$ MHZ.

For the radio frequency receive channel, after passing through the radio frequency mixer, the second signal received by the radio frequency receiver from the second carrier is shifted to $f_{DDC}$ as a whole, to obtain the second digital frequency conversion signal, where the center frequency of the second digital frequency conversion signal is $f_{DDC}$, and $f_{DDC}$ meets the following formula: $f_{DDC}=f_{RXRF}-f_{TXRF}=2470$ MHZ−2500 MHZ=−30 MHz.

The second digital frequency converter further shifts the spectrum of the second digital frequency conversion signal to $f_{DDC}$, to obtain the second baseband signal of the zero intermediate frequency.

For the radio frequency transmit channel, the first digital frequency converter does not perform the spectrum shift on the input first baseband signal $S_{TXBB}$, and directly outputs the first baseband signal to the radio frequency transmitter. The radio frequency transmitter directly performs the spectrum shift on the first baseband signal $S_{TXBB}$ based on the local oscillator signal provided by the local oscillator circuit in the processing manner in the conventional technology, to obtain the first signal, which is the same as that in the conventional technology. Details are not described herein again.

In the foregoing process, when the bandwidth of the second carrier is less than the bandwidth of the first carrier, the local oscillator circuit does not switch the frequency of the output local oscillator signal. In other words, when the radio frequency transmitter sends the uplink signal and when the radio frequency receiver receives the downlink signal, the frequency of the output local oscillator signal remains unchanged, and the frequency difference between the center frequency of the first carrier and the center frequency of the second carrier is compensated by using the second digital frequency converter. This avoids the problem that data transmission is interrupted when the local oscillator circuit switches the frequency of the output local oscillator signal.

Due to an increasing service volume of wireless communication, an existing wireless channel becomes more and more crowded. To support communication of a larger volume of data, the $3^{rd}$ generation partnership project (the $3^{rd}$ generation partnership project, 3GPP) lays out the NR frequency range 2 (Frequency Range 2, FR 2) for communication. Therefore, in this embodiment of this application, both the first carrier and the second carrier is in the frequency range 2 in the NR technical specification of the 3GPP. For a wireless communication system that works in the NR FR 2, a superheterodyne technology is considered for an architecture of a transceiver. In other words, analog frequency conversion is performed twice to shift a signal between a radio frequency carrier and a baseband. Based on an architecture shown in FIG. 8, FIG. 11 is a schematic diagram of a structure of a wireless communication apparatus applied to an NR FR 2 according to an embodiment of this application.

Figure 11:
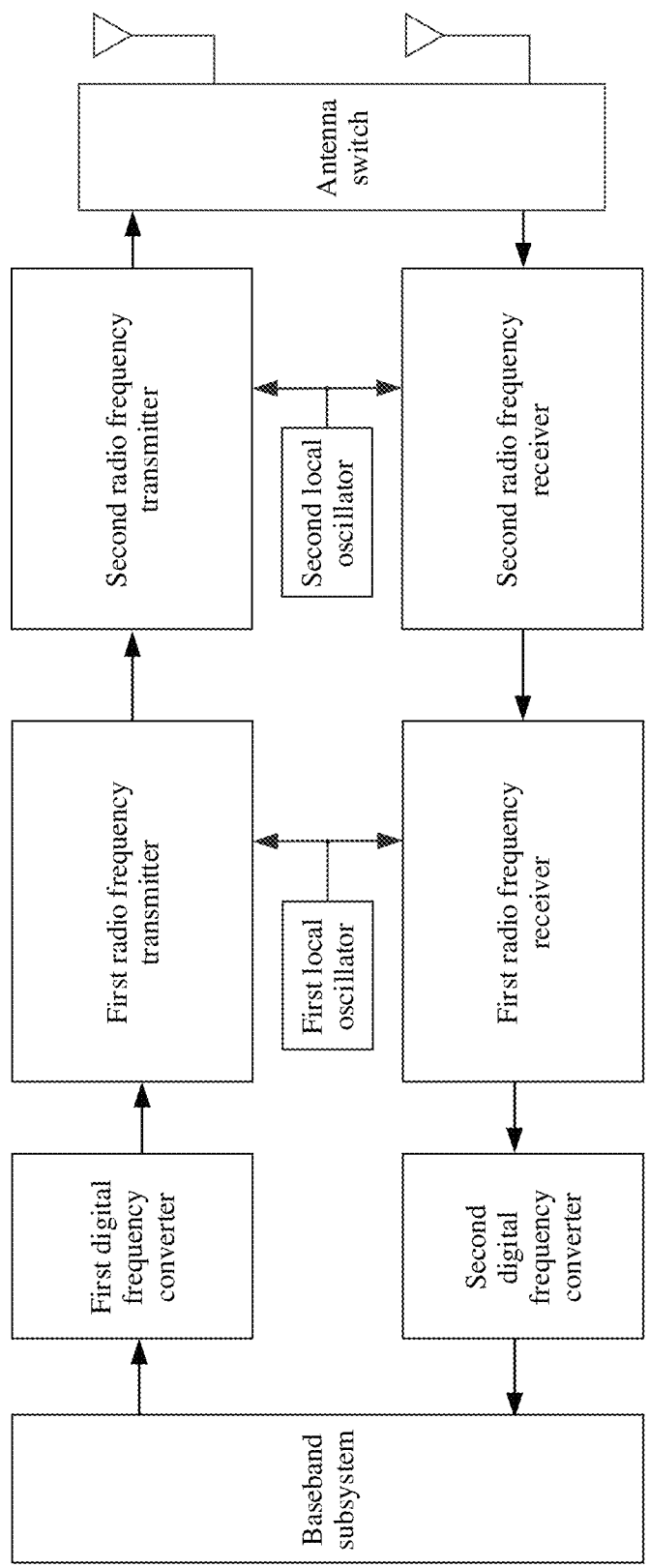
FIG. 11 is a schematic diagram of a structure of another wireless communication apparatus according to an embodiment of this application.

Compared with the architecture shown in FIG. 8, in FIG. 11, a local oscillator circuit includes a first local oscillator and a second local oscillator, a radio frequency transmitter includes a first radio frequency transmitter and a second radio frequency transmitter, and a radio frequency receiver includes a first radio frequency receiver and a second radio frequency receiver. The first local oscillator is configured to output a first local oscillator signal, and the second local oscillator is configured to output a second local oscillator signal.

The first local oscillator is separately coupled to the first radio frequency transmitter and the first radio frequency receiver, and provides a local oscillator signal that is of a same frequency as a local oscillator signal provided by the local oscillator and that is configured for use for a first-stage analog frequency mixing operation. The second local oscillator is separately coupled to the second radio frequency transmitter and the second radio frequency receiver, and provides a local oscillator signal that is of a same frequency as the local oscillator signal provided by the local oscillator and that is configured for use for a second-stage analog frequency mixing operation.

The first radio frequency transmitter coupled to the first local oscillator is configured to receive a first digital frequency conversion signal, and perform an analog frequency conversion operation on the first digital frequency conversion signal based on the first local oscillator signal to obtain a third signal.

The second radio frequency transmitter coupled to the second local oscillator is configured to receive the third signal, perform an analog frequency conversion operation on the third signal based on the second local oscillator signal to obtain a first signal, and transmit the first signal on a first carrier.

The second radio frequency receiver coupled to the second local oscillator is configured to receive a second signal on a second carrier, and perform a digital frequency conversion operation on the second signal based on the second local oscillator signal to obtain a fourth signal.

The first radio frequency receiver coupled to the first local oscillator is configured to receive the fourth signal, and perform a digital frequency conversion operation on the fourth signal based on the second local oscillator signal to obtain a second digital frequency conversion signal.

A working flow of an architecture shown in FIG. 11 is similar to that of the architecture shown in FIG. 8, but because a superheterodyne structure is used, a frequency conversion operation is added. For example, for a communication service that works in the NR FR 2, four consecutively distributed downlink CCs are allocated, which are a CC 0, a CC 1, a CC 2, and a CC 3. A bandwidth of each CC is 200 MHz, in other words, a total of 800 MHz downlink spectrum resources are allocated. In addition, one uplink CC is allocated, and a bandwidth of the CC is 200 MHz. The communication service is deployed in an NR band n257 frequency band, and a center frequency of a downlink signal is $f_{RXRF}$=28 GHz.

Center frequencies of the four downlink CCs are:
$f_{CC0RF}$=27.7 GHZ,
$f_{CC1RF}$=27.9 GHZ,
$f_{CC2RF}$=28.1 GHZ, and
$f_{CC3RF}$=28.3 GHZ.

It is assumed that, in this communication service, a center frequency of the one uplink CC is the same as the center frequency of the downlink CC 0. In other words, $f_{TXRF}$=$f_{CC0RF}$=27.7 GHZ.

Figure 12:
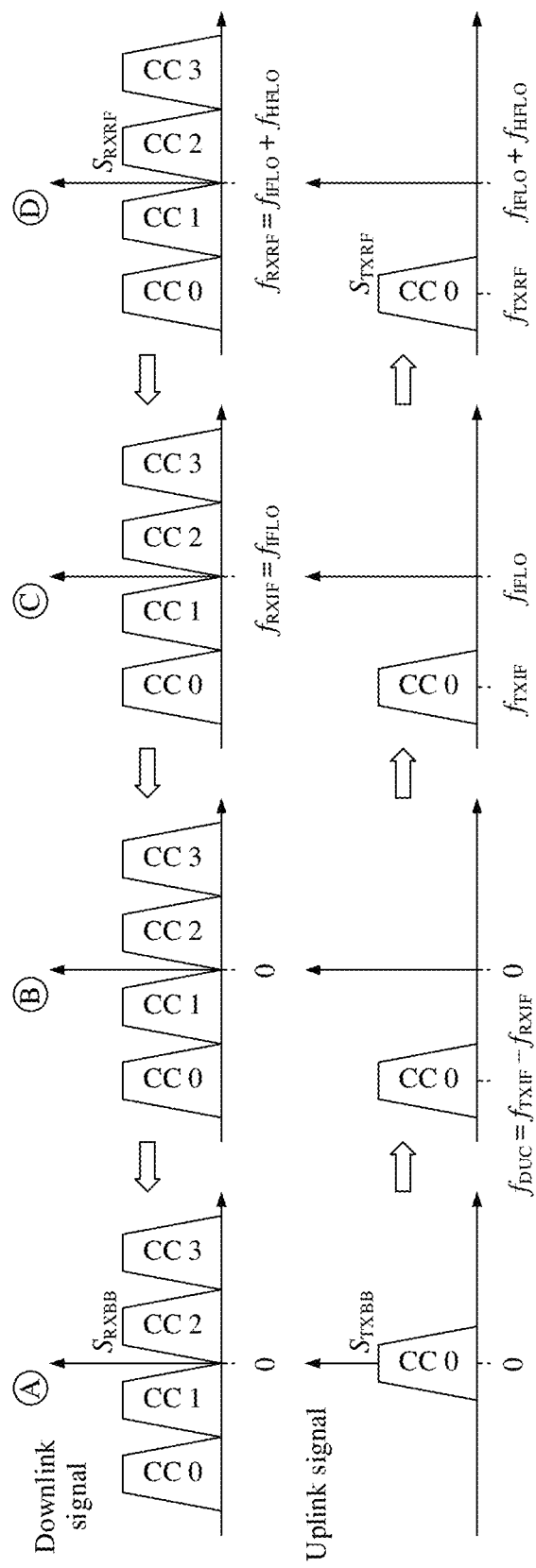
FIG. 12 is a schematic diagram of a carrier spectrum according to an embodiment of this application.

With reference to FIG. 12, in a radio frequency receive channel, the downlink signal first passes through the second radio frequency receiver, undergoes one frequency conversion, and is shifted to an intermediate frequency as a whole. In the second radio frequency receiver, a frequency of the second local oscillator signal provided by the second local oscillator is $f_{HFLO}$=20 GHZ.

A center frequency of a downlink signal after a shift is $f_{RXIF}$=$f_{RXRF}$−$f_{HFLO}$=28 GHz−20 GHZ=8 GHz.

The downlink signal enters the first radio frequency receiver, and a frequency of the first local oscillator signal provided by the first local oscillator is $f_{IFLO}$=8 GHz.

After passing through the first radio frequency receiver, the downlink intermediate frequency signal is shifted to a baseband as a whole and processed by a baseband subsystem. In this process, the second digital frequency converter does not perform a spectrum shift on an input signal.

In the communication service, an uplink signal is first processed by the first digital frequency converter, and is shifted to a frequency $f_{DUC}$. That is, $f_{DUC}$=$f_{TXRF}$−$f_{RXRF}$=27.7 GHZ−28 GHZ=−300 MHz.

A signal processed by the first digital frequency converter enters the first radio frequency transmitter, and the first radio frequency transmitter performs signal processing by using the first local oscillator signal of a same frequency as that of the first radio frequency receiver. In this case, a center frequency of the uplink signal after the first radio frequency transmitter performs a frequency shift is $f_{TXIF}$=$f_{DUC}$+$f_{IFLO}$=−300 MHz+8 GHZ=7.7 GHZ.

The uplink intermediate frequency signal output by the first radio frequency transmitter enters the second radio frequency transmitter. The second radio frequency transmitter performs signal processing by using the second local oscillator signal of a same frequency as that of the second radio frequency receiver. After passing through the second radio frequency transmitter, the center frequency of the uplink signal is shifted to $f_{TXRF}$. That is, $f_{TXRF}=f_{TXIF}+f_{HFLO}=7.7$ GHZ+20 GHZ=27.7 GHZ.

It is learned from the foregoing description that, by introducing the first digital frequency converter into a radio frequency transmit channel and introducing the second digital frequency converter into the radio frequency receive channel, a difference between the bandwidth of the uplink carrier and the bandwidth of the downlink carrier is compensated. In this way, one common local oscillator circuit is used to support a scenario in which the bandwidth of the uplink carrier and the bandwidth of the downlink carrier are asymmetric.

The method and the apparatus provided in the embodiments of this application further implements a fast SRS switching operation. For the SRS switching operation, when a terminal switches from one carrier to another carrier, because a frequency of a carrier changes, a frequency to which the radio frequency transmit channel is adapted also is adjusted. In the example in FIG. 4, when the terminal sends the data on the CC 1 in the symbol 0 and the symbol 1, in the conventional technology, the frequency of the local oscillator signal output by the local oscillator circuit is a frequency of the CC 1; and when the terminal sends the SRS on the CC 2 in the symbol 3, the frequency of the local oscillator signal output by the local oscillator circuit is a frequency of the CC 2. Because the frequency of the CC 1 is different from that of the CC 2, the local oscillator circuit adjusts the frequency of the output local oscillator signal in real time. The frequency of the local oscillator signal output by the local oscillator circuit is adjusted for a specific period of time, and communication cannot be performed in this period of time. In the example in FIG. 4, if the terminal completes carrier switching in the symbol 2, the radio frequency retuning time being less than or equal to a length of the symbol 2. If the radio frequency retuning time is greater than the length of the symbol 2, to ensure SRS transmission on the CC 2, the terminal starts carrier switching before the symbol 2. This affects data transmission in the symbol 1, and causes longer data transmission interruption time on the CC 1. Therefore, reducing the radio frequency retuning time in the SRS switching operation is significant for improving system performance.

Therefore, in this embodiment of this application, when the wireless communication apparatus shown in FIG. 8 is a terminal, during SRS switching, the terminal keeps the frequency of the local oscillator signal output by the local oscillator circuit unchanged. Instead, the digital frequency converter is used to compensate for a frequency difference between center frequencies of different carriers for sending SRSs. An SRS carrier switching scenario described in FIG. 4 is used as an example. In FIG. 4, when a normal communication service is performed, the radio frequency transmitter sends data on the CC 1, and the center frequency of the CC 1 is $f_1$. In other words, a center frequency of a signal sent by the radio frequency transmitter is $f_{TXRF}1=f_1$. The frequency of the local oscillator signal provided by the local oscillator circuit is $f_{LO}$.

With reference to the wireless communication apparatus shown in FIG. 8, in this scenario, when sending data on the CC 1 in the symbol 2, the radio frequency transmitter firsts shift the center frequency of the baseband signal $S_{TXBB}$ to $f_{DUC1}$ by using the first digital frequency converter. On this basis, the radio frequency transmitter performs a second spectrum shift based on the local oscillator signal. After the second spectrum shift, the center frequency of the signal $S_{TXRF}$ sent in the symbol 2 is $f_{TXRF1}$.

$f_{DUC1}$ meets the following formula: $f_{DUC1}=f_{TXRF1}-f_{LO}$.

When the transmitter sends the SRS on the CC 2 in the symbol 3, the frequency of the local oscillator signal provided by the local oscillator circuit remains unchanged, and a frequency adjusted through the spectrum shift of the first digital frequency converter is from $f_{DUC1}$ to $f_{DUC2}$, where $f_{DUC2}=f_2-f_{LO}$. $f_2$ is the center frequency of CC 2.

In this case, a center frequency $f_{TXRF2}$ of the SRS sent by the radio frequency transmitter is $f_{TXRF2}=f_{LO}+f_{DUC2}=f_2$.

It is learned from the foregoing description that the center frequency of the SRS is the same as the center frequency of the CC 2, and therefore the SRs are sent on the CC 2. Because the first digital frequency converter is implemented by using a digital circuit, fast frequency switching is implemented. In addition, in an entire process, the frequency of the local oscillator signal output by the local oscillator circuit is not modulated, so that a communication interruption caused by frequency modulation of the local oscillator signal does not occur. Therefore, performance stability of the radio frequency transmitter is improved, and transmission efficiency is improved.

Further, after the SRS sending is completed, when the radio frequency transmitter uses the CC 1 to send data again, the radio frequency transmitter adjusts the frequency through the spectrum shift of the first digital frequency converter to $f_{DUC1}$.

Figure 13:
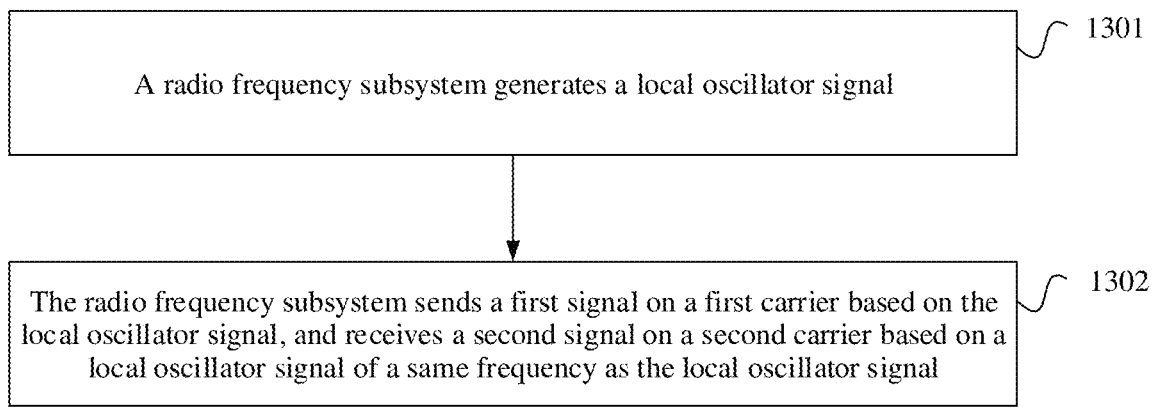
FIG. 13 is a schematic flowchart of a wireless communication method according to an embodiment of this application.

FIG. 13 is a schematic flowchart of a wireless communication method according to an embodiment of this application. The method is implemented by the wireless communication apparatus in the foregoing technical solutions. The wireless communication apparatus are a terminal, or is a base station. As shown in FIG. 13, the method includes:

Step 1301: A radio frequency subsystem generates a local oscillator signal.

Step 1302: The radio frequency subsystem sends a first signal on a first carrier based on the local oscillator signal, and receives a second signal on a second carrier based on a local oscillator signal of a same frequency as the local oscillator signal.

A center frequency of the first carrier is different from a center frequency of the second carrier. The radio frequency subsystem further provides a digital frequency conversion operation to compensate for a frequency difference between the center frequency of the first carrier and the center frequency of the second carrier.

In an optional implementation, a frequency of the local oscillator signal is equal to the center frequency of the first carrier, and the digital frequency conversion operation provided by the radio frequency subsystem includes:

The radio frequency subsystem converts the second signal into a baseband signal by performing the digital frequency conversion operation. A frequency switching range of the digital frequency conversion operation is the frequency difference between the center frequency of the first carrier and the center frequency of the second carrier.

In an optional implementation, a frequency of the local oscillator signal is equal to the center frequency of the second carrier, and the digital frequency conversion operation provided by the radio frequency subsystem includes:

The radio frequency subsystem converts a baseband signal into the first signal by performing the digital frequency conversion operation. A frequency switching range of the digital frequency conversion operation is the frequency difference between the center frequency of the first carrier and the center frequency of the second carrier.

In an optional implementation, the first carrier includes one component carrier, and the second carrier includes a plurality of component carriers. For example, center frequencies of four CCs included in the second carrier are 2470 MHZ, 2490 MHz, 2510 MHZ, and 2530 MHz. A center frequency of one CC included in the first carrier is any one of the following: 2470 MHZ, 2490 MHz, 2510 MHZ, and 2530 MHZ.

In an optional implementation, the first carrier includes a plurality of component carriers, and the second carrier includes one component carrier. For example, center frequencies of four CCs included in the first carrier are 2470 MHZ, 2490 MHz, 2510 MHZ, and 2530 MHz. A center frequency of one CC included in the second carrier is any one of the following: 2470 MHZ, 2490 MHz, 2510 MHZ, and 2530 MHZ.

In an optional implementation, both the first carrier and the second carrier are time division duplex TDD carriers, and the first carrier and the second carrier are located on a same frequency band.

In an optional implementation, both the first carrier and the second carrier are in the frequency range 2 of the new radio NR specification of the 3rd generation partnership project 3GPP.

A procedure of the method shown in FIG. 13 is further executed by a baseband subsystem. In this case, the baseband subsystem generates a local oscillator signal. A radio frequency subsystem further sends a first signal on a first carrier based on the local oscillator signal, and receive a second signal on a second carrier based on a local oscillator signal of the same frequency as the local oscillator signal.

A center frequency of the first carrier is different from a center frequency of the second carrier, and the radio frequency subsystem further provides a digital frequency conversion operation to compensate for a frequency difference between the center frequency of the first carrier and the center frequency of the second carrier.

Sequence numbers of the foregoing processes do not mean execution sequences in this application. The execution sequences of the processes are determined based on functions and internal logic of the processes, and not construed as any limitation on the implementation processes of the embodiments of this application. The term "coupling" mentioned in this application is used to indicate interworking or interaction between different components, and includes a direct connection or an indirect connection performed by using another component.

All or some of the foregoing embodiments of this application is implemented by using software, hardware, firmware, or any combination thereof. When the software is used to implement the embodiments, all or some of the embodiments are implemented in a form of a computer program product. The computer program product includes one or more computer program code or computer program instructions. When the computer program instructions are loaded and executed on a computer, all or some of the procedures or functions according to the embodiments of this application are generated. The computer is a general-purpose computer, a special-purpose computer, a computer network, or another programmable apparatus.

The computer program code or the computer program instructions are stored in a computer-readable storage medium or is transmitted from a computer-readable storage medium to another computer-readable storage medium. For example, the computer program code or the computer program instructions are transmitted from a website, computer, server, or data center to another website, computer, server, or data center in a wired (for example, a coaxial cable or an optical fiber) or wireless (for example, infrared, radio, or microwave) manner. The computer-readable storage medium is any usable medium accessible by a computer, or a data storage device, such as a server or a data center, integrating one or more usable media. The usable medium is a magnetic medium, for example, a floppy disk, a hard disk, or a magnetic tape; is an optical medium, for example, a DVD; or is a semiconductor medium, for example, a solid state disk (solid state disk, SSD).

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

It is clear that a person skilled in the art makes various modifications and variations to this application without departing from the scope of this application. This application is intended to cover the modifications and variations of this application provided that the modifications and variations fall within the scope of the claims of this application and equivalent technologies thereof.

What is claimed is:

1. A wireless communication apparatus, comprising:
  a local oscillator circuit configured to provide a first local oscillator signal;
  a radio frequency transmitter coupled to the local oscillator circuit and configured to send a first signal on a first carrier based on the first local oscillator signal;
  a radio frequency receiver coupled to the local oscillator circuit and configured to receive a second signal on a second carrier based on a second local oscillator signal, of a same frequency as the first local oscillator signal, provided by the local oscillator circuit; and
  a digital frequency converter coupled to the radio frequency transmitter and the radio frequency receiver, configured to provide a digital frequency conversion operation to compensate for a frequency difference between a center frequency of the first carrier and a center frequency of the second carrier.

2. The wireless communication apparatus according to claim 1, wherein:
  a frequency of the first local oscillator signal is equal to the center frequency of the first carrier, the digital frequency converter is configured to convert the second signal into a baseband signal by performing the digital frequency conversion operation, and a frequency switching range of the digital frequency conversion operation is the frequency difference between the center frequency of the first carrier and the center frequency of the second carrier.

3. The wireless communication apparatus according to claim 1, wherein:
  a frequency of the second local oscillator signal is equal to the center frequency of the second carrier, the digital frequency converter is configured to convert a baseband signal into the first signal by performing the digital frequency conversion operation, and a frequency switching range of the digital frequency conversion operation is the frequency difference between the center frequency of the first carrier and the center frequency of the second carrier.

4. The wireless communication apparatus according to claim 2, further comprising:
a baseband subsystem, configured to process the baseband signal.

5. The wireless communication apparatus according to claim 1, wherein
the digital frequency converter comprises a first digital frequency converter and a second digital frequency converter, the first digital frequency converter is coupled to the radio frequency transmitter, and the second digital frequency converter is coupled to the radio frequency receiver.

6. The wireless communication apparatus according to claim 1, wherein
the first carrier comprises one component carrier, and the second carrier comprises a plurality of component carriers.

7. The wireless communication apparatus according to claim 1, wherein
both the first carrier and the second carrier are time division duplex (TDD) carriers, and the first carrier and the second carrier are located on a same frequency band.

8. The wireless communication apparatus according to claim 1, wherein:
the local oscillator circuit comprises a first local oscillator and a second local oscillator;
the radio frequency transmitter comprises a first radio frequency transmitter and a second radio frequency transmitter;
the radio frequency receiver comprises a first radio frequency receiver and a second radio frequency receiver;
the first local oscillator is coupled to the first radio frequency transmitter and the first radio frequency receiver, and provides a third local oscillator signal that is of a same frequency as the first local oscillator signal and that is required for a first-stage analog frequency mixing operation; and
the second local oscillator is coupled to the second radio frequency transmitter and the second radio frequency receiver, and provides a fourth local oscillator signal that is of a same frequency as the second local oscillator signal and that is required for a second-stage analog frequency mixing operation.

9. The wireless communication apparatus according to claim 8, wherein:
both the first carrier and the second carrier are in a frequency range 2 of a new radio (NR) specification of $3^{rd}$ generation partnership project (3GPP).

10. The wireless communication apparatus according to claim 1, wherein:
the digital frequency converter, the radio frequency receiver, and the radio frequency transmitter are integrated into a same integrated circuit chip.

11. A wireless communication method, comprising:
generating, by a radio frequency subsystem, a first local oscillator signal; and
sending, by the radio frequency subsystem, a first signal on a first carrier based on the first local oscillator signal, and receiving a second signal on a second carrier based on a second local oscillator signal of a same frequency as the first local oscillator signal, wherein
a center frequency of the first carrier is different from a center frequency of the second carrier, and the radio frequency subsystem further provides a digital frequency conversion operation to compensate for a frequency difference between the center frequency of the first carrier and the center frequency of the second carrier.

12. The method according to claim 11, wherein:
a frequency of the first local oscillator signal is equal to the center frequency of the first carrier, and the digital frequency conversion operation provided by the radio frequency subsystem comprises:
converting, by the radio frequency subsystem, the second signal into a baseband signal by performing the digital frequency conversion operation, wherein a frequency switching range of the digital frequency conversion operation is the frequency difference between the center frequency of the first carrier and the center frequency of the second carrier.

13. The method according to claim 11, wherein:
a frequency of the second local oscillator signal is equal to the center frequency of the second carrier, and the digital frequency conversion operation provided by the radio frequency subsystem comprises:
converting, by the radio frequency subsystem, a baseband signal into the first signal by performing the digital frequency conversion operation, wherein a frequency switching range of the digital frequency conversion operation is the frequency difference between the center frequency of the first carrier and the center frequency of the second carrier.

14. The method according to claim 11, wherein:
the first carrier comprises one component carrier, and the second carrier comprises a plurality of component carriers.

15. The method according to claim 11, wherein:
both the first carrier and the second carrier are time division duplex (TDD) carriers, and the first carrier and the second carrier are located on a same frequency band.

16. A radio frequency subsystem, comprises:
a processor; and
a memory configured to store program instructions and the processor is configured to execute the program instructions that implement a method that includes:
generate a first local oscillator signal; and
send a first signal on a first carrier based on the first local oscillator signal, and receiving a second signal on a second carrier based on a second local oscillator signal of a same frequency as the first local oscillator signal, wherein
a center frequency of the first carrier is different from a center frequency of the second carrier, and the radio frequency subsystem further provides a digital frequency conversion operation to compensate for a frequency difference between the center frequency of the first carrier and the center frequency of the second carrier.

17. The radio frequency subsystem according to claim 16, wherein:
a frequency of the first local oscillator signal is equal to the center frequency of the first carrier, and the digital frequency conversion operation comprises:
convert the second signal into a baseband signal by performing the digital frequency conversion operation, wherein a frequency switching range of the digital frequency conversion operation is the frequency difference between the center frequency of the first carrier and the center frequency of the second carrier.

18. The radio frequency subsystem according to claim 16, wherein:
- a frequency of the second local oscillator signal is equal to the center frequency of the second carrier, and the digital frequency conversion operation provided by the radio frequency subsystem comprises:
  - convert a baseband signal into the first signal by performing the digital frequency conversion operation, wherein a frequency switching range of the digital frequency conversion operation is the frequency difference between the center frequency of the first carrier and the center frequency of the second carrier.

19. The radio frequency subsystem according to claim 16, wherein:
- the first carrier comprises one component carrier, and the second carrier comprises a plurality of component carriers.

20. The radio frequency subsystem according to claim 16, wherein:
- both the first carrier and the second carrier are time division duplex (TDD) carriers, and the first carrier and the second carrier are located on a same frequency band.

* * * * *